United States Patent [19]

Lahr

[11] 4,179,212

[45] Dec. 18, 1979

[54] DEMAND PUBLISHING ROYALTY ACCOUNTING SYSTEM

[75] Inventor: Roy J. Lahr, Fairfield, Conn.

[73] Assignee: Xerox Corporation, Stamford, Conn.

[21] Appl. No.: 830,928

[22] Filed: Sep. 6, 1977

[51] Int. Cl.$^2$ ............................................. G03G 15/00
[52] U.S. Cl. ................................. 355/14 R; 355/3 R; 355/133
[58] Field of Search .................... 355/3 R, 14, 133, 75

[56] References Cited

PUBLICATIONS

"Secure Document Feature for Copy Machines", IBM Tech. Disc. Bull., vol. 15, No. 9, Feb. 73, pp. 2736, 2737.
"Secure Document Feature for Copy Machines", IBM Tech. Disc. Bull., vol. 17, No. 11, Apr. 75, pp. 3198, 3199.
"Preventing Copying of Classified Information", IBM Tech. Disc. Bull., vol. 19, No. 4, Sep. 76, pp. 1469, 1470.
"Unauthorized Copy Prevention", IBM Tech. Disc. Bull., vol. 15, No. 12, May 73, p. 3642.

Primary Examiner—R. L. Moses
Attorney, Agent, or Firm—Irving Keschner

[57] ABSTRACT

A transaction accounting system for the automated royalty accounting of copyright-coded paper documents. The system includes a document copier, a copier access control system which includes a transaction data terminal for input of transaction information such as the date of the transaction, coded copyright information such as contained in the standard serial numbering or standard book numbering systems, user identification and number of copies to be produced. The access control system includes enabling circuits to access the copier upon completion of the data input and one or more data recorders and/or data transmitters to permit use of telephone line transmission of the transaction data and/or other transmitting facilities to communicate with a royalty accounting system. The documents are copyright coded with an optically transparent, electrically conductive coating. The system includes a decoder with its output connected to the transaction data terminal to input the document data. A keyboard is also furnished for input of other data. The access control system is provided with a delete sequence to delete a previously recorded transaction; an override sequence operation to access to the copiers with incomplete or no transaction data; a tranmit sequence operation for data transmission to a remote computer and the like; and an incorrect mode selection to correct for mistakes in input information. The input terminal is also provided with a self-prompting display to facilitate input of transaction data in the proper sequence.

16 Claims, 27 Drawing Figures

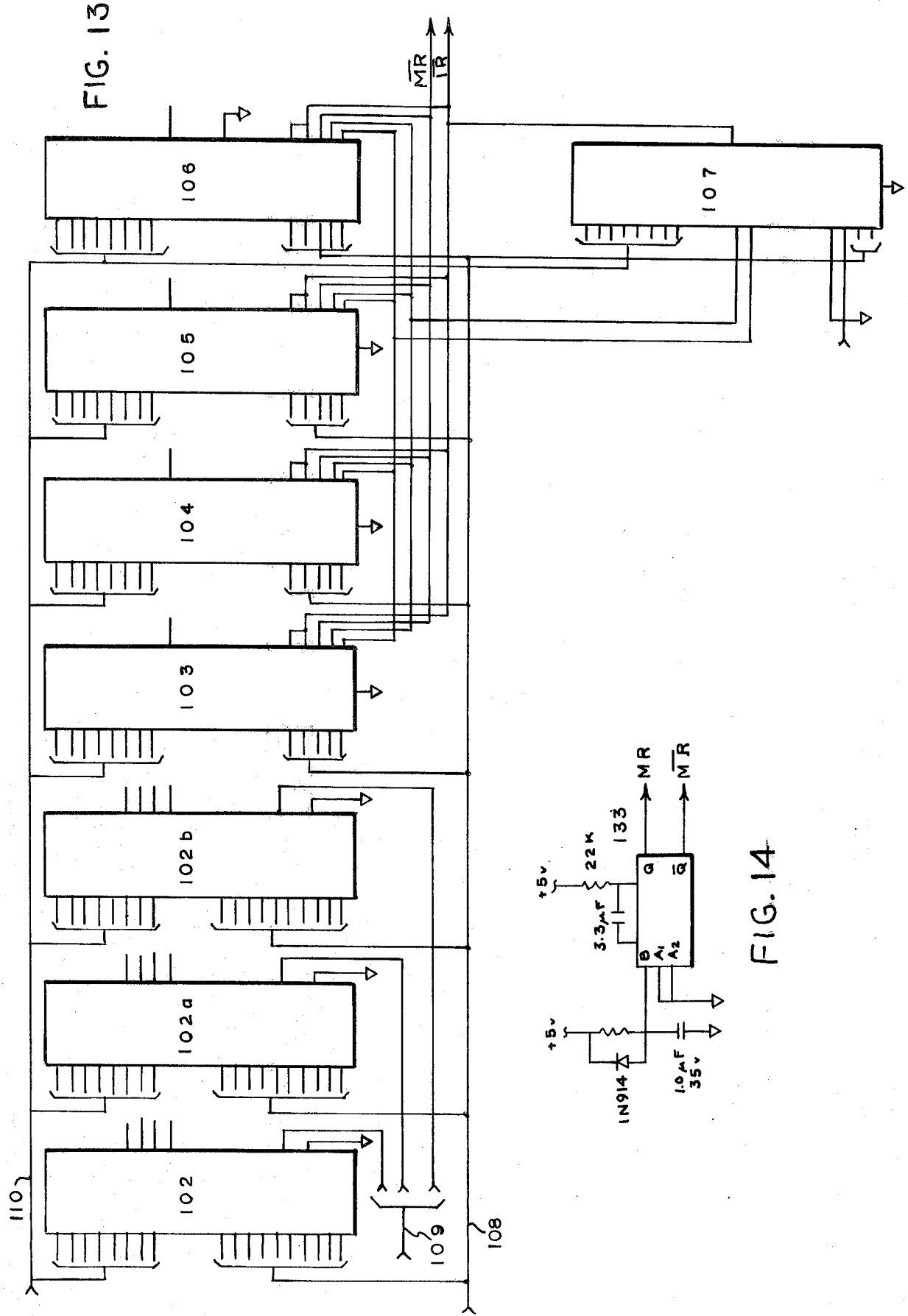

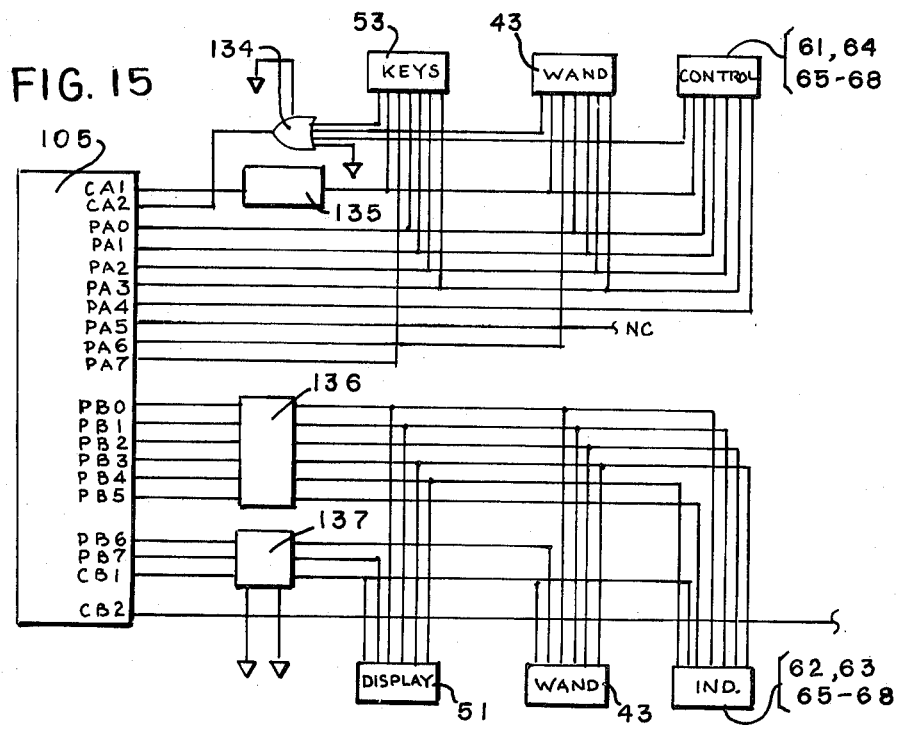
FIG. 15
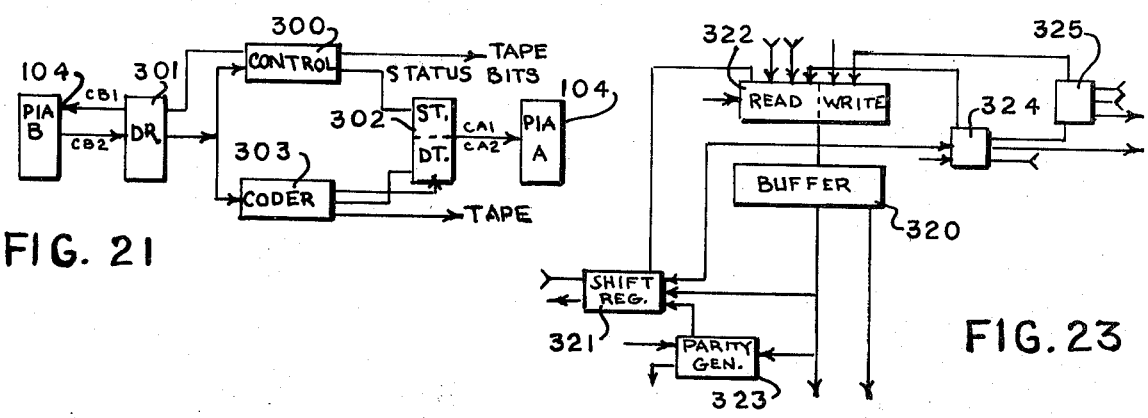
FIG. 21
FIG. 23
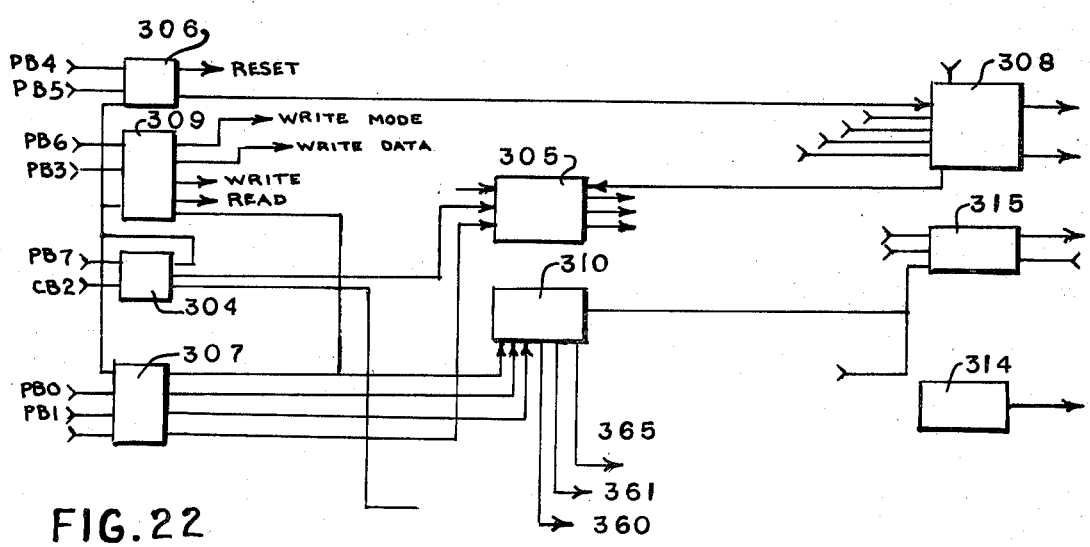
FIG. 22

DEMAND PUBLISHING ROYALTY ACCOUNTING SYSTEM

BACKGROUND OF THE INVENTION

The widespread use of document reproduction facilities such as the ubiquitous photo copier has created a significant problem to present royalty accounting systems. These copying facilities have found widespread use primarily because of their convenience for the "fair user" such as students and researchers who seek a single copy of a copyrighted document. Unfortunately, these copiers provide the same convenience for the mass copying of documents by copyright infringers and the present non-automated systems of royalty accounting are not capable of dealing with this problem.

Recent progress has been made in establishing universal numbering standards to permit a digital coding of documents; the standard book numbering system comprises a ten-digit number and the standard serial numbering system provides a seven-digit number that records group identification such as national, geographic, or language information, publisher identification and title of the copyrighted document. The raw copyright data is, therefore, already adapted to a numerical code intended for automated digital processing.

Rapid scanning of digital information has also been developed in the bar code and optical decoding devices such as an optical wand and the like for receiving and inputting numerical data to digital processing. It is, therefore, not surprising to find that others have suggested that the universal book and serial numbering systems be reduced to a bar code on the copyrighted document and that copying facilities at document storage locations such as libraries and the like be provided with an access control system requiring the input of the digital copyright information from a bar code to enable the copying machines for reproduction of the copyrighted document.

The access control systems which have been suggested by others, however, lack adequate input capability to permit a convenient and widespread usage. Ideally the access control should provide for receiving input user information data by a manual keyboard or by an optical bar code and the like. Additionally, the system should provide for the automated recording and storage of the transaction data as well as for the transmission of the data through a data terminal by use of an acoustical coupler and the like to permit use of telephone facilities to communicate to remotely located central accounting offices.

It is also desirable that all the material protected by the copyright notice be safeguarded against copying by a control such as a code carried on each page of the material so that the accounting system cannot be readily defeated.

BRIEF DESCRIPTION OF THE INVENTION

This invention comprises paper sheet documents bearing an optically transparent, copyright intelligence code. In the simplest form, the code indicates that the document is the subject of copyright and functions with a decoding means and an interlock means of the copy printer that prevents operation of the printer until the necessary accounting data for the transaction have been entered into an automated transaction accounting system associated with the copy printer. In other embodiments, the code can include certain basic copyright intelligence such as the identity of the publisher or copyright holder and the document classification. More sophisticated codes can include the complete digital coding of the book or serial numbering system, although, for most applications, it may be preferable to provide a single, complete digital coding with the copyright notice of the book or periodical and provide only a sufficient code on the individual pages that will prevent defeating the accounting system.

The complete automated transaction accounting system includes the aforementioned copy printer; a copier access control system for the input of transaction data through a transaction data terminal including an optical wand and the like for processing of bar coded document and/or user identification and a manual keyboard for input of information such as the date of the transaction, number of copies, user identification, etc. The system also includes enabling means to access the copier upon the successful completion of the data input with data recording means such as magnetic and/or paper tape recorders to record and store the transaction data. Preferably the system includes a data terminal and has a data transmission sequence mode to permit communicating of stored or simultaneously entered transaction data with a royalty accounting system. In the preferred embodiment, the data terminal includes an acoustical coupler to permit the direct use of telephone lines for communication to remove royalty accounting offices.

BRIEF DESCRIPTION OF THE FIGURES

The invention will be described with reference to the figures of which:

FIGS. 12–14 illustrate the system control electronics;

FIG. 15 is a schematic diagram of the control box interface;

FIG. 21 is a block diagram of the magnetic tape interface;

FIG. 22 is a block diagram of the control logic of the magnetic tape interface;

FIG. 23 is a block diagram of the encoder-decoder for the magnetic tape;

DESCRIPTION OF THE PREFERRED EMBODIMENT

Figure 1:
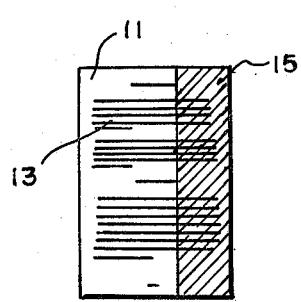
FIGS. 1–3 illustrate various copyright codes on base paper sheets.

Referring to FIG. 1, there is illustrated a document having a base paper sheet 11 bearing visible indicia 13 such as printed matter and the like which is the subject of copyright. The base sheet also bears an area 15 of an optically transparent coating. In this and subsequent illustrations, the area of the electrically conductive coating is shown by shading; however, in actual practice the area would not be visible. The coating can be formed of an electrically conductive material such as inorganic salts or oxides or polyelectrolytes which are impregnated into or laminated onto the paper base sheet 11.

The area 15 can be a single area of uniform distribution of the electrically conductive material and thereby function solely to indicate that the printed matter is copyrighted. Alternatively, the conductive material can be of preselected density and/or identity to provide a specific electrical conductivity characteristic of a specific publisher (copyright owner) and/or document classification, thereby providing sufficient copyright information to a cooperating decoder for a rudementary, automated copyright royalty accounting system.

Figure 2:
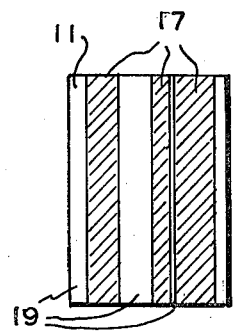

As shown in FIG. 2, the optically invisible code can also be provided in the form of alternating bands 17 of varied bandwidth separated by uncoated, narrow-width bands 19. The specific conductivity of each band can also be varied, if desired. This coding can provide digital coding of the complete book or serial numbering system, if desired.

Figure 3:
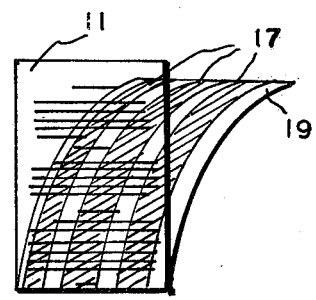

Referring now to FIG. 3, the base paper sheet 11 can be laminated with a transparent film 21 which carries the electrically conductive area such as bands 17. In this embodiment, a transparent conductor such as an inorganic salt or oxide is applied to a sheet film such as polyethylene, polyvinyl chloride, polyvinylidene chloride, and the like and the resultant film is laminated to the paper sheet 11 by bonding with heat and/or a suitable adhesive.

Preferably, the coating of the electrically conductive coating is applied during the fabrication of the paper sheet stock or during the printing process so that the application does not significantly affect the publishing cost. Paper sheet stock is manufactured from wood pulp by Fourdrinier paper machines which include a step of spraying of an aqueous solution of a sizing material, typically starch, onto the paper at an intermediate location in the dryer section of the paper machine. Other additives such as synthetic resins, clays, whiteners, etc., are also added to impart stiffness, body and luster to the paper. The base paper sheet stock can be coded for a particular publisher and/or class of document by including a preselected electrolyte at a predetermined concentration in the sizing or treatment solution or, in the event of solution incompatibility, in a separate solution which is also applied, typically by spraying, onto the paper stock being processed through the Fourinier machine.

Alternatively, the copyright code can be applied to plain paper sheet stock during the printing process. Substantially all printing prrocesses use offset rotary printing presses wherein an offset die carried on a rotary drum transfers ink to the sheet stock as it passes over a backing drum or roller of the printing press. The copyright code in the form of areas of preselected electrolyte density and/or dimensions, e.g., band width, can be applied using a similar offset die an auxiliary printing roller to transfer the electrolyte solution to the sheet stock passing through the printing press.

Electrolytes suitable for use in the invention include inorganic salts and oxides such as water soluble alkali metal, alkaline earth and water soluble periodic group IB, IIB, VA, VB, VIB, VIIB and VIII metal oxides, halides nitrates, phosphates, sulfates, e.g., sodium chloride, potassium fluoride, lithium sulfate, sodium phosphate, calcium chloride, magnesium sulfate, madnesium oxide, cupric sulfate, zinc nitrate, tin oxide, lead chloride, titanium iodide, zirconium chloride, vanadium nitrate, chromium chloride, manganese sulfate, ferric chloride, cobalt nitrate, nickel nitrate, etc.

The aforementioned inorganic electrolytes can be dissolved or dispersed in the sizing solution which is typically a starch solution at a sufficient concentration, e.g., from 1 to about 35 weight percent to impart electrical conductivity to the paper. Alternatively, the electrolytes can be incorporated in an aqueous solution sprayed onto the paper sheet stock or applied by printing press offset die plates. If desired, the solutions can contain film forming additives such as a latex of polyvinyl acetate, styrene-butadiene, etc.

Polyelectrolytes can also be used including naturally occurring materials such as gum arabic or carrageenan and synthetic polyionic polymers such as polycations and polyanions which are described in U.S. Pat. No. 2,795,567 and U.S. Pat. No. 2,883,356, respectively.

As disclosed in U.S. Pat. No. 3,883,356, the polyanions include the polymers of various unsaturated aliphatic mono- and polycarboxylic acids or salts thereof. Examples of such are the homopolymers of the acrylic acids, e.g., polyacrylic acid, polymethacrylic acid, polyethlacrylic acid, etc., as well as copolymers of the aforementioned with various vinyl monomers such as vinyl chloride, styrene, vinyl formate, vinyl acetate, vinyl methyl ether, vinyl ethyl ether, etc. Copolymers of alpha, beta-unsaturated dicarboxylic acids such as maleic acid, maleic anhydride, citraconic acid, etc. with the aforementioned vinyl compounds can also be employed. Polar monomers can be employed to obtain water soluble polyanions; however, various non-polar monomers such as ethylene, propylene, isobutylene, styrene, -methyl styrene, etc., can also be copolymerized with any of the aforementioned unsaturated carboxylic acids.

The polycations are disclosed in U.S. Pat. No. 2,795,567 as of the type termed "ethylenic" polymers, i.e., polymers prepared by vinyl polymerization or polymerication of at least one mono-olefinic compound through aliphatic unsaturation, said polymers having numerous side chains distributed along a substantially linear, continuous carbon atom chain. Moderate branching and cross-linking of this chain are permissible. The side chains can be all of one type or can be of different types so long as some contain basic groups, e.g., heterocyclic amino nitrogen groups, amino alkyl groups, etc. The number of such groups, and the relative proportions of the hydrophilic and hydrophobic groups being such as to provide a polymeric compound having a substantially large number of ionizable radicals which give rise to a cationic polymer molecule by electrolytic dissociation in water. As described in the aforesaid patent, such polymers or polycations can be derived by the homopolymerization of the vinyl pyridines, e.g., 4-methyl vinyl pyridine, 2-ethyl vinyl pyridine, the N-vinyl amines, N-allyl amines, etc. Any of the aforementioned vinyl monomers can be homopolymerized or can be copolymerized with various other vinyl monomers such as vinyl acetate, vinyl formate, vinyl chloride, acrylonitrile, styrene, acrylic acid esters, methacrylic acid esters, ethylene, propylene, isobutylene, alpha methyl styrene, alkyl vinyl ethers, acrylonitrile, methacrylonitrile, etc.

Various polycations can also be obtained by the hydrogenation of polyacrylonitrile or polymethacrylonitrile or copolymers of acrylonitrile and methacrylonitrile with any of the aforementioned vinyl monomers. Polycations can also be obtained by the polymerization of various amino esters of unsaturated acids, e.g., the polymerization of esters obtained by the esterification of methacrylic acid, acrylic acid, fumaric acid, maleic acid with alkylol amines such as ethanolamine, triethanolamine, etc.

The aforementioned polylon polymers can be prepared by any conventional polymerication technique employed for the polymerication of ethylenically unsaturated monomers. In general, such techniques comprise the bulk polymerization of the monomers or the polymerication of the monomers in a reaction medium such as water, in solution, or as an emulsion. Various initiators for the polymerization such as peroxide or azo compounds can be employed, e.g., benzoyl peroxide, diteriary butyl peroxide, lauroyl peroxide, or a, a-azobisisobutyronitrile, diazonium halides, etc.

Figure 4:
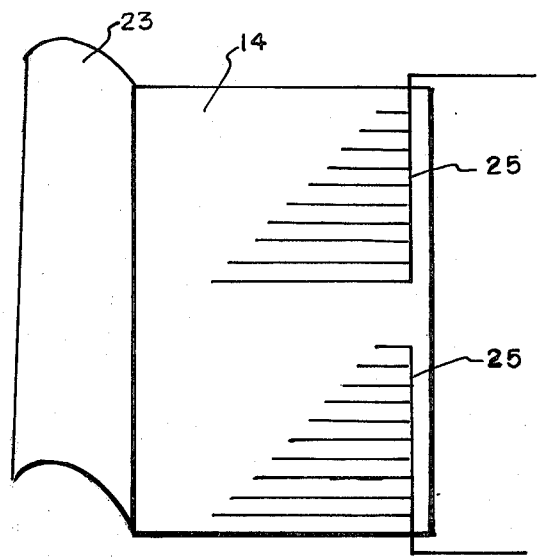
FIGS. 4 and 5 illustrate various electrode grid patterns useful as decoders in the copy printer.

The copy printer is provided with suitable decoder means to identify a copyright coded document when the document is placed on the glass platen of the printer. FIG. 4 illustrates the glass platen 14 and the document cover 23. The glass platen has a transparent conductive overlay having a pattern of conductors 25 which are positioned to sense the electrically conductive, optically transparent coating of the document. As shown in FIG. 4, the pattern can simply be a pair of spaced-apart conductors which detect the document coating and, in some applications, its electrical conductivity, to obtain basic copyright information such as publisher and/or document class.

Figure 5:
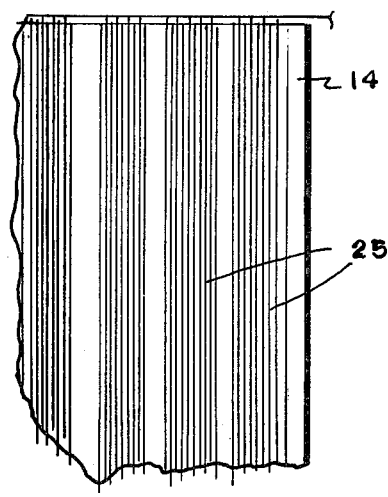

FIG. 5 illustrates a more sophisticated conductor pattern in which the glass platen has an overlay of a plurality of parallel conductors 25. This pattern can be used with a varied bandwidth document pattern such as shown in FIG. 2 wherein the bandwidth is sufficient to bridge between any successive, adjacent, ten conductors 25 so that each bandwidth can provide digital information 0-9, and the complete pattern can provide all the necessary copyright information for the standard book and serial numbering system.

The printer also has an interlock switch that is activated by the document code to deactivate the printer unless the necessary transaction data has been cleared through the transaction accounting system.

Figure 6:
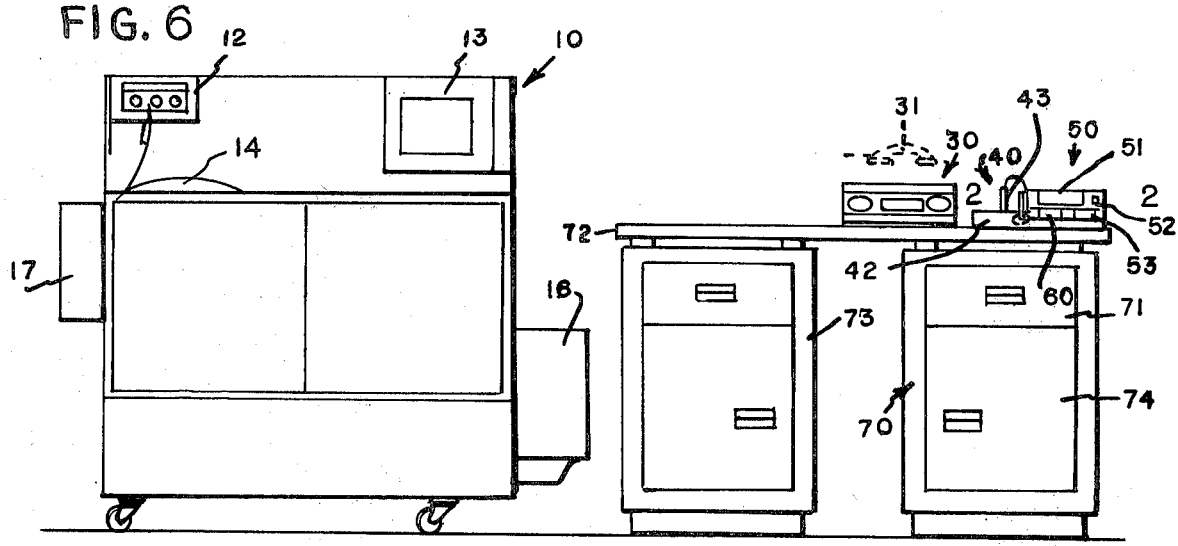
FIG. 6 is a view of a typical complete installation of the invention.

Referring now to FIG. 6, the transaction accounting system of the invention is shown together with the copying facilities, access to which is controlled by the invention system. As there illustrated, the complete system includes a xerographic printer 10, an acoustic coupling data terminal 30; a bar code reader 40, a control panel 50, and system electronics housed within a console 70. The system is conveniently provided with a mating console 73 for storage and for support of the table 72.

The xerographic printer is a conventional hard copy printer such as that marketed by Xerox Corporation, Model 970 MPS which includes a front control panel 12 for selection of the number of copies desired. The document to be copied is placed onto the glass platen 14, where it is scanned by the copier onto a photoconductive surface, all contained within the housing 16 of the hard copier 10. The blank paper storage for the copier is in bin 18 and the hard copies are delivered to a collection bin 20. Further descriptions of suitable copy systems can be found in U.S. Pat. Nos. 3,373,653 to R. R. Roberts et al and 3,400,631 to R. C. Rauscher.

The data terminal 30 is a commercial acoustic data coupling device available from Texas instruments as model Silent 700 data terminal. It is intended for the acoustic coupling of transaction data through a conventional phone receiver hand set 31 and telephone transmission lines to a remote accounting system.

The optical bar code reader 40 includes a platform 42, preferably inclined to table 72, for support of a document and an optical wand 43 used for reading conventional bar coded information. Control panel 50 includes a digital display panel 51, power indicator 52, a digital keyboard 53, and a sequence mode selector panel 60.

The consoles 70 and 73 which provide for storage of the electronic components of the system and/or accessory equipment include slide drawers 71 and hinged front doors 74.

Figure 7:
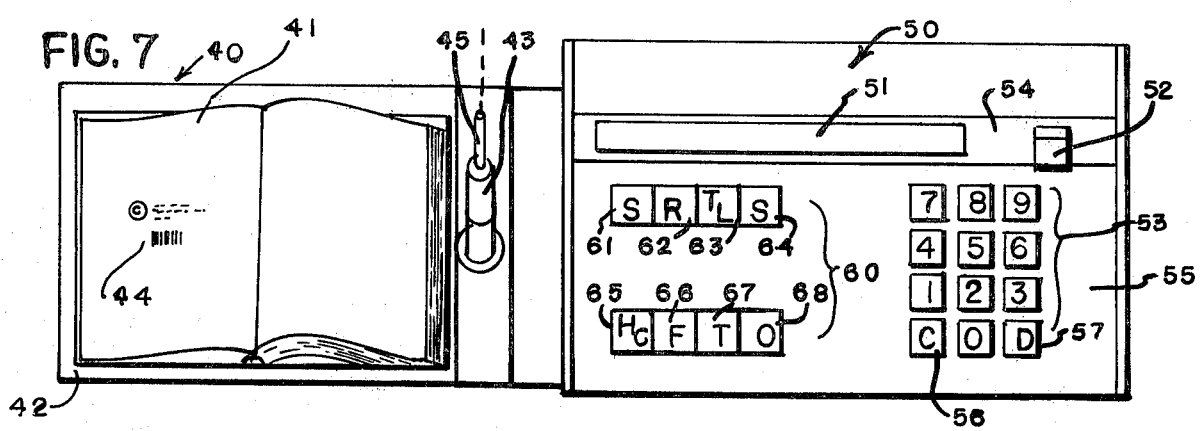
FIG. 7 is a view along lines 7—7 of FIG. 6.

Referring now to FIG. 7, the data input and selector control panel will be described in greater detail. As there illustrated, a document such as a book 41 is placed on support platform 42. The copyright page of book 41 is provided with a bar code 44 which comprises document information encoded in a standard, universal product code form. Information which is thus encoded can comprise the digital standard book numbering system a, ten-digit number providing group identification of the document such as its national or geographical origin and language; publisher identification and document title together with a standardized check digit. Similar information is provided for periodicals or journals using the standard serial numbering system which includes a seven-digit informational code and a check digit.

The bar code reading means can be a rapid scanning means or, more conveniently, an optical wand 43 which is a hand held tool adapted to be manually moved across the bar code 44 for sensing the coded information with an optical system that is electronically processed into digital information and passed through cord 45 to the system electronics.

Adjacent the bar code reader 40 is the control box 50 of the transaction accounting system. The upright front panel 54 of the control box includes a twelve digit LED display panel 51 and a power indicator 52. The forward deck 55 of the control box has a horizontally inclined cover in which are mounted a digital, calculator type keyboard 53 that includes a key 56 for correction of data input and a delete key 57 for recording negative transactions, in a manner hereinafter described, necessitated, e.g., when illegible copies are produced.

The remainder of the front deck 55 receives the sequence mode selector panel 60 which includes start button 61, a ready indicator 62, indicator 63 to warn the operator that insufficient recording tape is in storage, a stop button 64, a hard copy select button 65, a microfiche duplicator button 66, a transmit mode selector button 67 and an override button 68 permitting enabling of the copying machines 10 without input of the transaction data.

Figure 8:
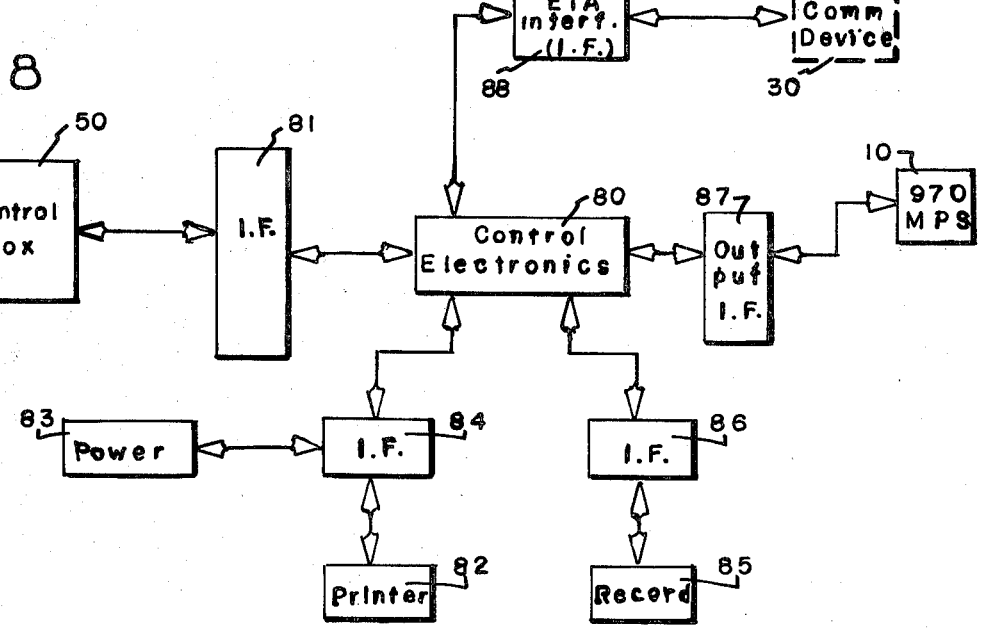
FIG. 8 is a simplified block diagram of the transaction accounting system.

FIG. 8 is a simplified block diagram of the transaction accounting system showing the functional interconnections of the various parts of the system. The control electronics 80 is connected through interface 81 to control box 50, previously described. The transaction data are recorded on suitable means such as a paper tape printer 82 which is provided with a power supply 83 and connected to the control electronics through printer interface 84. Other recording means can be used instead of or besides the aforementioned paper tape printer, including a conventional magnetic tape recorder 85 such as a conventional cassette recorder that is connected to the control electronics through interface 86.

The communicating device such as the data terminal 30 is connected to the control electronics through the EIA interface 88.

Figure 9:
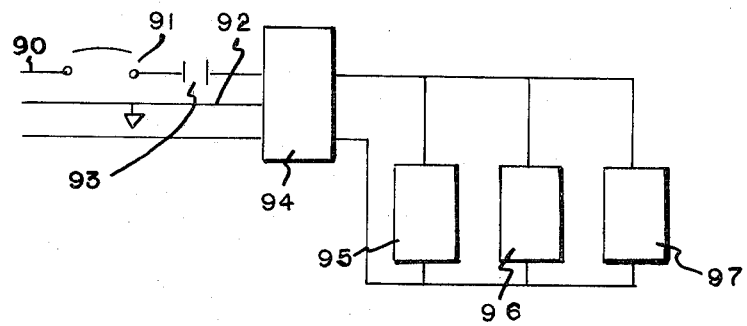
FIG. 9 is a block diagram of the AC power distribution of the system.

Referring now to FIG. 9, the AC power is supplied to console 70 through a receptacle on the back side of the console. The live power line 90 is provided with a circuit breaker on-off switch 91 located on the front of the console behind door 72 while the access door to the rear of the console 70 has an interlocking switch to disconnect the AC power when the access door is opened. Line 92 provides a chassis ground for the electronics and capacitor 93 and line filter 94 provided for EMI considerations. A low voltage power supply 95 of 12 volts DC is provided by a conventional voltage regulator (AC/DC Electronics ET 401-11) and a similar voltage supply 96 is provided for 2± volt DC power supply. The latter unit is AC/DC Electronics EC/5 N31. The printer power supply 97 is provided at the line AC voltage.

Figure 10:
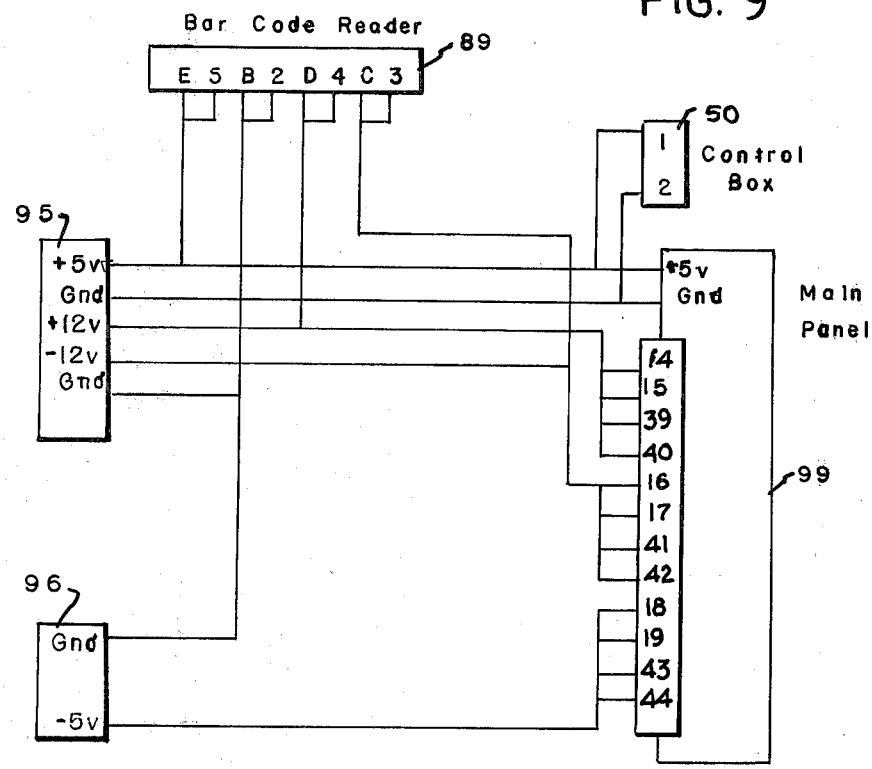
FIG. 10 illustrates the low voltage power distribution used in the system of the invention.

Referring now to FIG. 10, the low voltage power distribution is shown with the low voltage power supply 95 connected to the indicated terminals 89 of the bar code reader printed circuit board and, with the 5 volt power supply 96 connected to the main electronics panel 99 at the identified terminals. The power supply 95 is also connected across terminals 1 and 2 of the control box 50.

Figure 11:
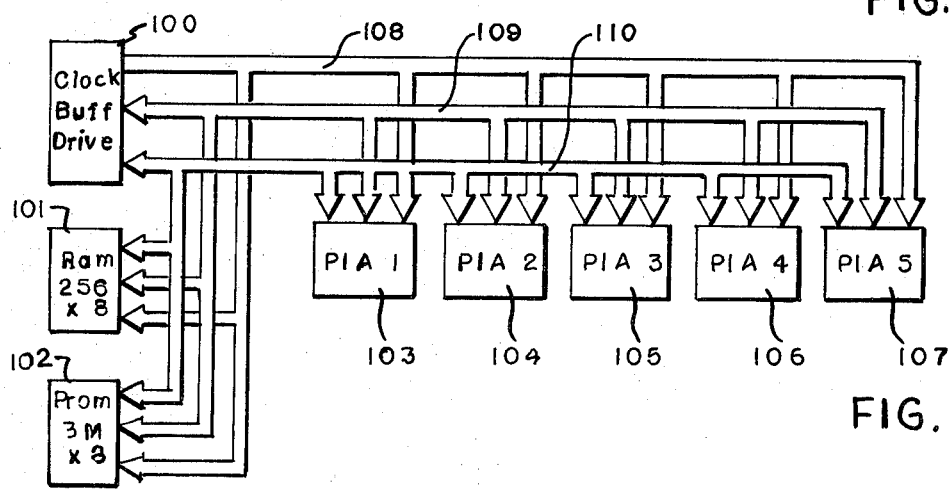
FIG. 11 is a firmware block diagram of the control electronics of the system.

Referring now to FIG. 11, the firm ware block diagram for the control electronics will be described. The control electronics employs the Motorolla 6800 microcomputer family of devices and includes the microcomputer clock M6870 and buffer drivers. As shown in FIG. 11, the control electronics includes the microprocessor unit 100, a 256 byte ram 101, a 3K byte PROM 102 and interface adapters 103-107 which are interconnected by address bus 108, control bus 109 and data bus 110. Address bus 108 has 16 lines and is output only in terms of the microprocessor unit 100. The data bus is bidirectional and has eight lines to transfer data to and from the memory and peripheral adapters 103-107.

Figure 12:
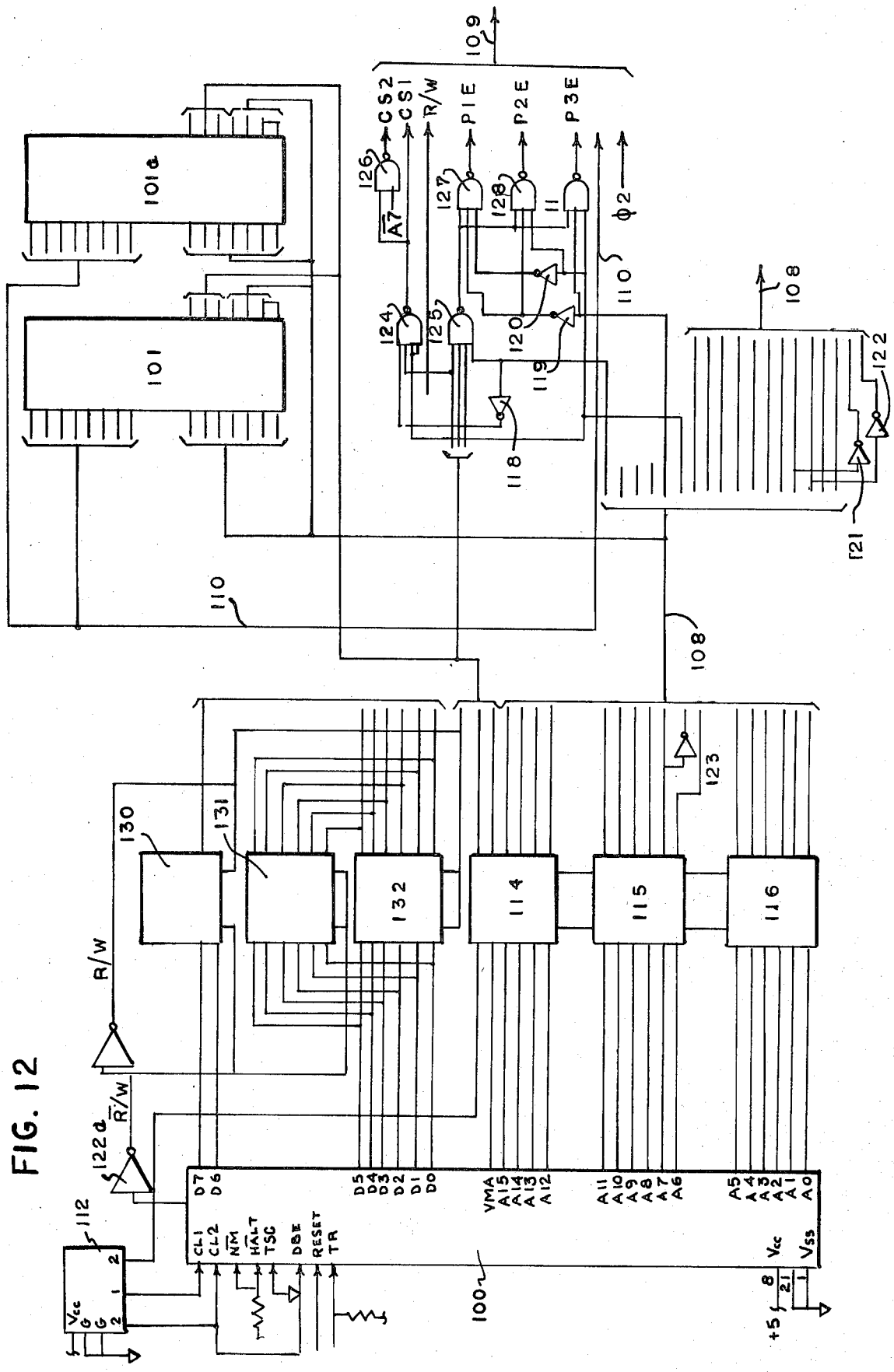

Referring now to FIGS. 12 and 13, the control electronics identified as block 80 in FIG. 8 will be described in greater detail. As shown on FIG. 12, the microprocessing unit 100 receives two clock signals from system clock 112 which is a crystal controlled oscillator in a high-bred module requiring no adjustment. This clock operates at 1 MHZ. The system busses described with regard to FIG. 11 are shown in the illustration wherein the 16-line address bus 108 is connected to the output terminals of the microprocessor unit 100 through buffer registers 114-116 which extend the drive capability of the microprocessor unit address bus. The necessary address decoding to generate the proper chip select signals for the enabling devices requiring such signals is accomplished by the address decoding section which includes inverters 118-123 and the NAND gates 124-129. The system memory map set forth in the following table gives the various locations in memory of the devices in this section which is accessed by the proper address code on the address bus and by signals from the control bus that are used in the generation of the device enable signals hereafter mentioned.

TABLE 1

| DEVICE SELECTED | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ELEMENT 101 | x | x | x | x | x | x | x | 0 | • | • | 0 | • | • | • | • | 0 |
| ELEMENT 102 | x | x | x | x | x | x | x | 1 | • | • | 0 | • | • | • | • | 0 |
| ELEMENT 103 | x | x | 0 | 0 | x | x | x | 0 | • | • | 1 | • | • | • | • | 0 |
| ELEMENT 104 | x | x | 1 | 0 | x | x | x | 0 | • | • | 1 | • | • | • | • | 0 |
| ELEMENT 105 | x | x | 0 | 1 | x | x | x | 0 | • | • | 1 | • | • | • | • | 0 |
| ELEMENT 106 | x | x | 1 | 1 | x | x | x | 0 | • | • | 1 | • | • | • | • | 0 |
| ELEMENT 107 | x | 0 | • | • | • | • | • | 1 | • | • | 1 | • | • | • | • | 0 |
| ELEMENT 102 | x | x | x | x | x | x | x | x | x | x | 0 | 0 | • | • | • | 1 |
| ELEMENT 102a | x | x | x | x | x | x | x | x | x | x | 1 | 0 | • | • | • | 1 |
| ELEMENT 102b | x | x | x | x | x | x | x | x | x | x | 1 | 1 | • | • | • | 1 | x—VARIABLE ADDRESS
0—LOGIC 0
1—LOGIC 1
•—DON'T CARE

The eight-line bidirectional data bus 110 transfers data to and from the memory and peripheral devices. The registers 130-132 are used as bidirectional bus extenders and the direction of data flow in data bus 110 is controlled by the Read/Write (R/W) signal from the microprocessor unit 100. When this signal is high the microprocessor unit is in the read state to receive input data and when the signal is low the microprocessor unit is in write state for data output.

The control bus 109 carries the remainder of the signals including the PROM 1, 2 and 3 enabling signals shown as P1E, P2E and P3E from the decoding section, the R/W signal, the valid memory address signal (CS1), the IRQ, interrupt request signal, enable, reset, etc.

Referring now to FIG. 13, the subsystems of the transaction accounting system are connected to the microprocessor section through the peripheral interface adapters 102-107. Each of these peripheral interface adapters consists of two bidirectional eight-bit peripheral busses and four control lines. These interface adapters appear as memory locations to the microprocessor unit 100 and are accessed by a combination of the proper address and necessary enable signals carried on the address bus 108 and control bus 109, respectively. The functional configurations of the peripheral interface adapters are programmed by the microprocessor unit 100 during the initialization of the transaction accounting system.

The schematic diagram of the microprocessor section, FIG. 12, shows only the connections used by the microprocessor unit to interface with the peripheral interface adapters. The two eight-bit data busses and four control lines are shown on the schematic diagrams of each of the respective subsystem interfaces, FIGS. 15-19, and 19-22 described hereinafter.

The interface adapter 107 is an asynchronous communications interface adapter to provide data formatting and control to interface serial, asynchronous data communications information to the microprocessor unit 100; its functional configuration is also programmed by the microprocessor unit 100 during the system initialization. At that such time, variables such as word length, clock division ratios and transmit-receive controls are established. The interface adapter 107 appears as memory to the microprocessor unit 100 and is accessed accordingly.

Referring now to FIG. 14, there is shown a monostable multivibrator 133 which provides a master reset pulse (MR) when power is applied to the system. The rising power supply voltage is sensed and when it reaches the proper level a pulse of approximately 50 MS is generated and is used throughout the system to initialize the circuitry.

The application of power to the control circuitry generates the master reset pulse and, after a slight delay, the system clock 112 begins operation. The duration of the master reset pulse allows a minimum of eight complete clock cycles to occur before enabling the microprocessor unit 100 and the remaining system components. The trailing edge of the master reset pulse causes the microprocessor unit 100 to begin a reset sequence. At such time, the contents of the last two locations in memory are loaded into the microprocessor units; these are addresses FFFE and FFFF and are located at PROM unit 102b (refer to the system memory map, Table 1). The starting address of the operating software is stored in these locations and the microprocessor unit begins system initialization. During this phase of the operating system the various interface adapters are configured and the microprocessor unit prepares itself for normal system operation.

Upon completion of the system initialization, the microprocessor unit 100 goes into a standby mode of operation. Because of dynamic characteristics of the internal registers, the microprocessor unit activity never completely halts and this mode of operation is actually a "wait-for-interrupt" mode operation during which the microprocessor unit 100 is performing several software tests.

The microprocessor unit is interrupt driven out of the standby or wait mode of operation in response to an activity occurring in one or more of the subsystems such as an interrupt resulting by an operator pressing a control panel switch. When the microprocessor unit senses an interrupt it begins a polling sequence to determine the source of the interrupt by reading the interface adapters 102-107 in a predetermined sequence. Once the microprocessor unit 100 determines the source of the interrupt signal, the program control passes to the appropriate subroutine to complete the operation. Upon completion of the operation, the microprocessor unit 100 resumes its standby or wait mode of operation.

FIG. 15 is a block diagram of the control box interface. The interface consists of four parts which are the keyboard 53, the light pin 43, the display panel 51 and the front panel sequence mode selector controls and indicators which are grouped as elements 60 in FIG. 2 and which include controls 61, 64 and 65-68, indicators 62 and 63 and indicating lights associated with controls 65-68.

Peripheral interface adapter 105 interfaces this section with the microprocessor unit. The signal lines PA 0-PA7 comprise the eight-bit input data bus while signal lines PB0-PB7 provide an eight-bit output data bus. Signal line CA2 receives the interrupt signal from NOR gate 134 which receives the interrupt command from keys 53, wand 43 or the control panel. Signal line CA2 carries the output signal to device 135 indicating the microprocessor unit response to the interrupt input signal. These two signals are active for the data input into the microprocessor unit section. Signal line CB2 is used to indicate data ready when the microprocessor unit section has output data to provide to the control box interface.

The data that is passed to and from the microprocessor unit section and the control box interface is all numerical in form. As a result, only the low order bits PA0-PA3 for the input case and PB0-PB3 for the output case are required to form a data word. The high order bits PA4-PA7 and PB4-PB7 are used as simple addresses or control functions.

The schematic diagrams of the sections which individually comprise the control box interface elements are described in greater detail hereinafter with reference to FIGS. 16-18 and 26 and include the following table showing the function of the low order bits and the appropriate address bit for that section. The bits used for the control functions are also shown in the table.

The following table summarizes the bit assignment:

TABLE 2

| DATA INPUT TO MICROPROCESSOR UNIT SECTION | |
|---|---|
| PA0-PA3 | Data word |
| PA4 | Logic 1 indicates front panel controls section |
| PA5 | Not used |
| PA6 | Logic 1 indicates Light Pin Section |
| PA7 | Logic 1 indicates Keyboard Section |

| DATA OUTPUT FROM MICROPROCESSOR UNIT SECTION | |
|---|---|
| PB0-PB3 | Data word |
| PB4 | Control function, as identified on the schematic diagram of the front panel section (FIG. 11); |
| PB5 | Logic 1 indicates Front Panel Controls Section |
| PB6 | Logic 1 indicates Light Pin Section |
| PB7 | Logic 1 indicates Display Section. |

Figure 16:
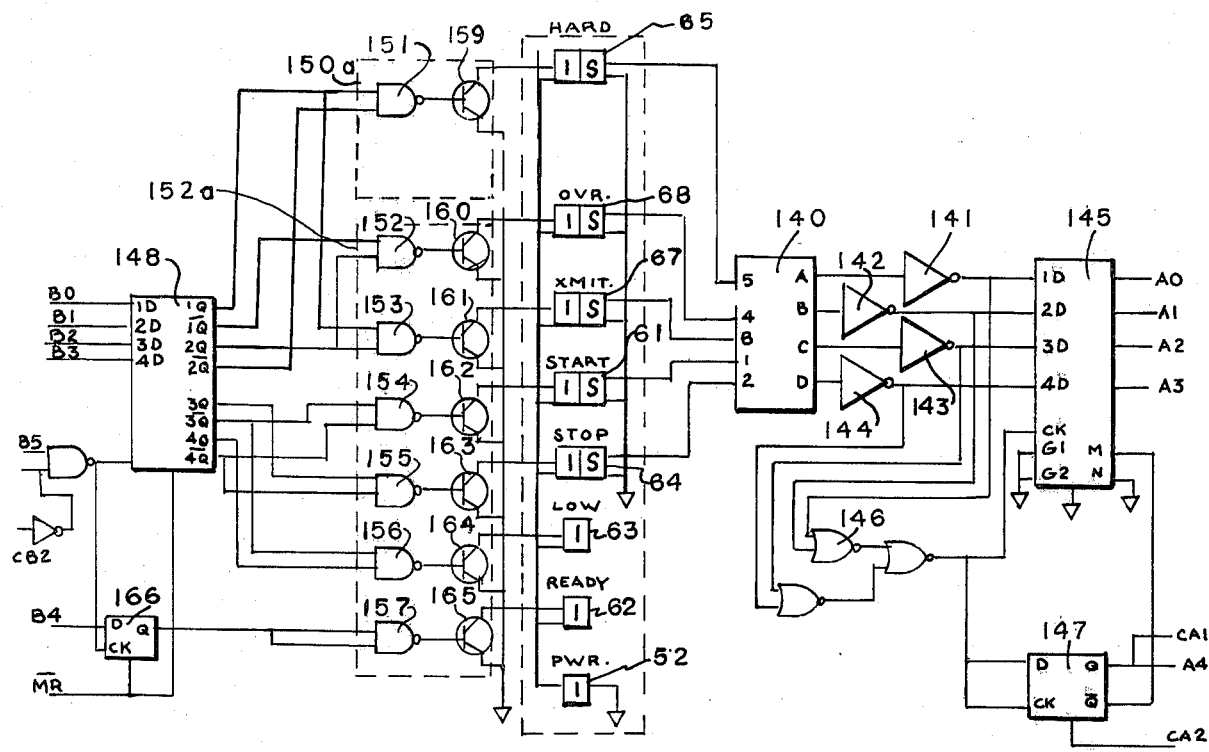
FIG. 16 is a schematic diagram of the front panel controls interface.

The front panel control section will be described with reference to FIG. 16 which is the schematic diagram of this section. The section contains the necessary switches and indicators to permit control of the system operation and display of the status of the system.

The following tables set forth the bit pattern of the four-bit data word associated with each switch or indicator. The switches are all momentary push-button types that use solid state circuitry to generate a TTL level to indicate a contact closure. The indicators are part of the switches except for indicators 62, 63 and 52 which are indicators alone.

TABLE 4

| SWITCH SELECTED | PA3 | PA2 | PA1 | PA0 |
|---|---|---|---|---|
| 61—START | 0 | 0 | 0 | 1 |
| 64—STOP | 0 | 0 | 1 | 0 |
| 67—XMIT | 0 | 0 | 1 | 1 |
| 68—OVERRIDE | 0 | 1 | 0 | 0 |
| 65—HARD COPY | 0 | 1 | 0 | 1 |
| 66—FICHE | 0 | 1 | 1 | 0 |

TABLE 5

| INDICATORS | PB0 | PB1 | PB2 | PB3 |
|---|---|---|---|---|
| 65—HARD COPY | 0 | 0 | x | x |
| 66—FICHE | 1 | 0 | x | x |
| 68—OVERRIDE | 1 | 1 | x | x |
| 67—XMIT | 1 | 1 | x | x |
| 61—START | x | x | 0 | 0 |
| 64—STOP | x | x | 1 | 0 |
| 63—LOW TAPE | x | x | 0 | 1 |
| 62—READY | | | | PB4—1 | x—DON'T CARE

Device 140 is a decoder that senses the switch outputs and generates the four-bit data word associated with each switch function. The data words generated are passed through inverters 141-144 to the quad latch 145. The positive OR gate 146 senses any change in the output of the decoder 140 and generates a clock signal to store the data word in the quad latch 145. A clock signal also causes flip flop 147 to set. The output of flip flop 147 sets the interrupt signal CA1, address bit A4 and enables the tri-state output of the quad latch 145. The microprocessor unit 100 reads the data word in response to the interrupt signal and clears the flip flop 147 which resets the output.

With the exception of the power-on indicator 52, the microprocessor unit 100 has control of the status of each indicator. Quad latch 148 has double rail output and stores the four-bit data words sent from the microprocessor unit section. The Nand Gates 150-157 are used as decoder drivers to decode the data word and turn on the proper indicator through their respective transistors 158-165. The microprocessor unit 100 has control of the ready indicator 62 by use of the address bit B4 and flip flop 166. This is provided to permit the proper combinations of mode and status to be maintained while operations indicated by the ready indicator are occurring.

Figure 17:
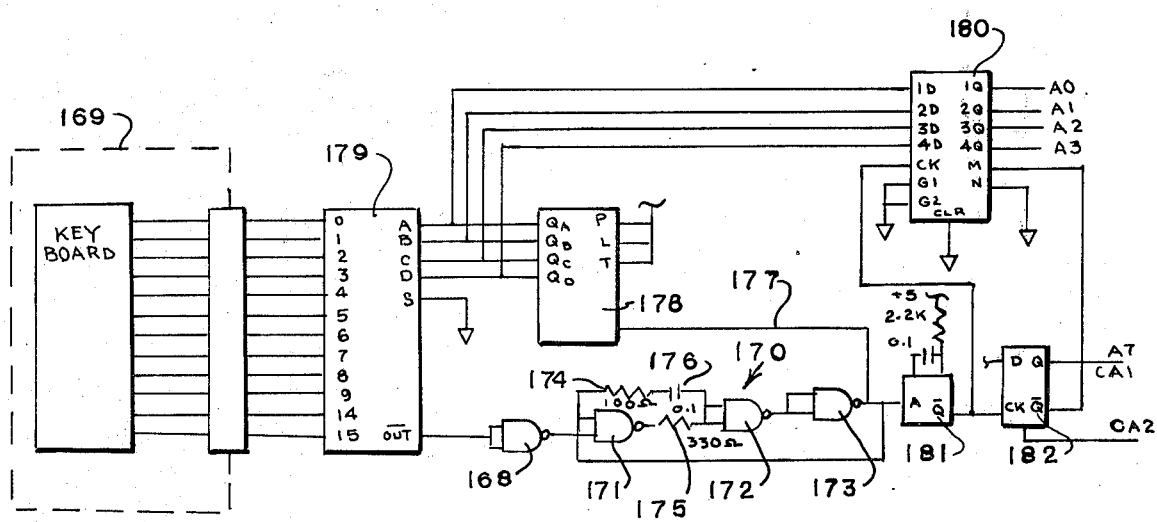
FIG. 17 is a circuit diagram of the keyboard interface.

The schematic diagram of the keyboard section interface is FIG. 17. The keyboard section is used for data input only and the data board itself is a standard 12 position (4×3) type having a calculator format; see FIG. 7. The switches used in the keyboard or solid state devices which require no debouncing. A TTL-level signal is generated whenever a key has been depressed.

The keyboard interface circuit is provided with an RC oscillator 170 formed of discrete parts including NAND gates 171-173 and an RC network of resistors 174, and 175 and capacitor 176. The output of the oscillator is connected through lead 177 to a binary counter 178. Counter 178 drives a 16-1 data selector 179 that sequentially looks at the 12 keyboard output lines. When a key is depressed, its corresponding output line goes high and the output of the 16-1 data selector 179 goes high when the selected keyboard output line is encountered by the scanning sequence. This action causes the scan oscillator 170 to stop which stops the binary counter 178. The four-bit data word present at the output of the binary counter now represents the value assigned to the key that has been depressed. The four-bit data word is also connected to a data register 180.

The output of the scan oscillator 170 is also connected to a retriggerable, one-shot device 181. As long as this scan oscillator 170 is running (no keys depressed) the one-shot is continually retriggered and its output remains low. When the scan oscillator stops the one-shot is allowed time out which results in its output going high. This signal going high causes the data register 180 to store the four-bit data word from the binary counter 178. The signal also sets flip flop 182. Flip flop 182 generates an interrupt signal to the microprocessor unit section, sets bit A7 high indicating the keyboard interface and enables the tristate output of the data register 180. The microprocessor unit 100 reads the control box signal P1A as a result of the interrupt and the eight-bit data word containing the key word information and address is passed to the microprocessor unit section for processing. The microprocessor unit action of reading the control box signal P1A may also cause signal CA2 to go low for approximately one machine cycle. This signal going low clears the flip flop 182 which turns out the output of the data register 180. This completes the operation of passing the information represented by depressing a key to the microprocessor unit section for processing.

Figure 18:
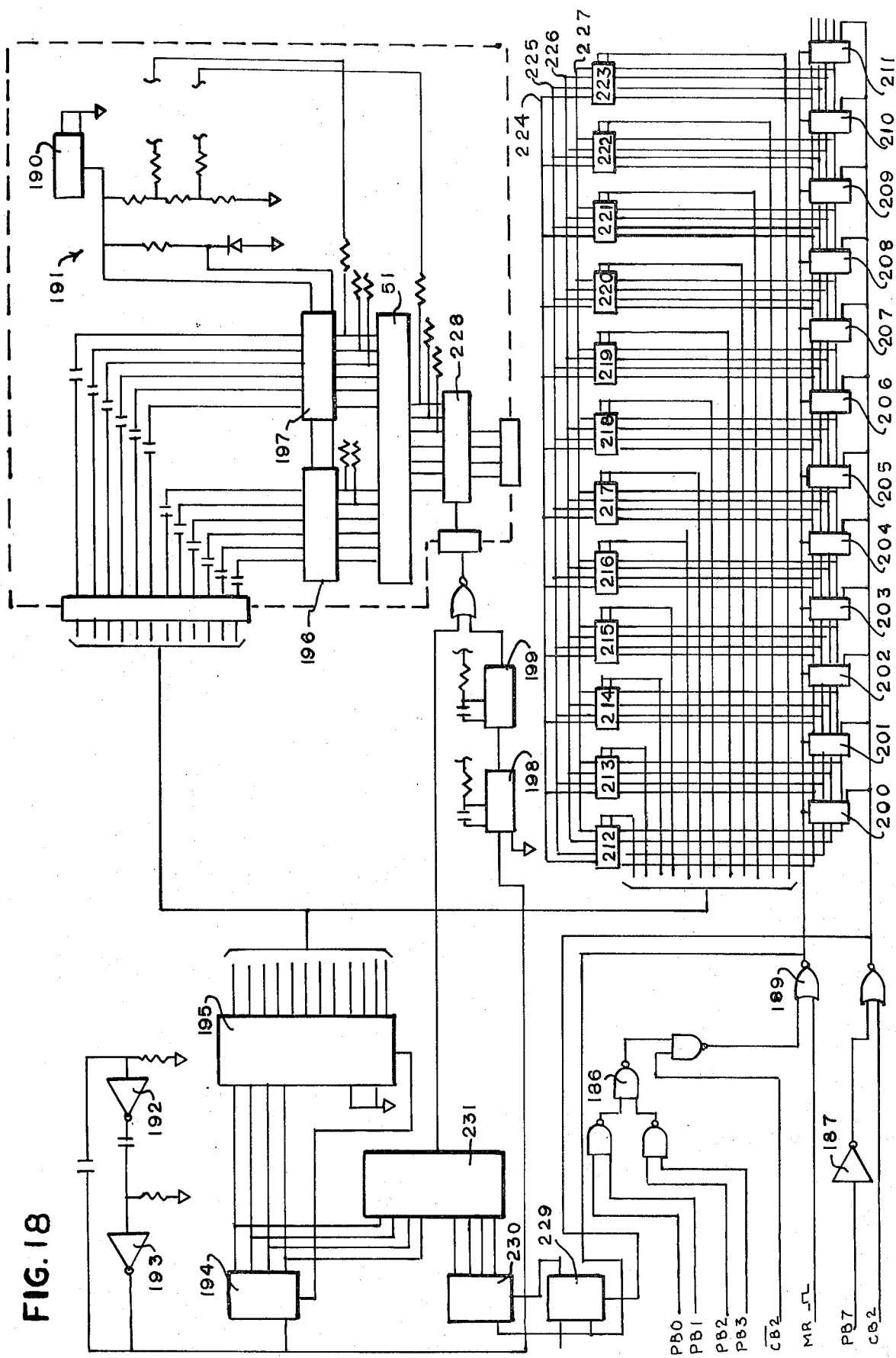
FIG. 18 is a circuit diagram of the display interface.

FIG. 18 is the schematic for the display section interface. The display section consists of a twelve digit gas discharge display panel 51 and associated circuitry. The display panel is designed for multiplex operation with all like cathode segments bussed internally. Each anode has its own external connection. The display panel 51 requires an ionization voltage of approximately 170 volts which is supplied by a DC to DC converter 190. The voltage divider 191 across the output of the converter provides bias voltages to insure the digits are below the ionized level when deselected. Characters are displayed by successively applying positive signals in sequence to the anodes corresponding to each of the digit positions. At the same time the appropriate cathode segment busses are switched to near ground.

The two stable multivibrators 192 and 193 generate approximately 7KHz scan frequency whose output clocks a binary counter 194. The counter outputs provide the inputs to a four to sixteen decoder 195. The thirteenth output pulse from decoder 195 is fed back to reset the counter 194. The resultant twelve sequential pulses are capacitively coupled to anode drivers 196 and 197 and the twelve digit position buffer drivers 212-223. Display cathode blanking is obtained by running the scan oscillator output through two cascaded monostable multivibrators 198 and 199 to provide a cathode drive signal that has an approximately 25 microsecond leading edge and 50 microsecond trailing edge blanking interval relative to the anode digit select pulse. The four-bit data word sent to the display section are stored in the quad latches 200-211. There is one quad latch for each digit position and the output of each latch is fed to its corresponding driver 212-223. The anode digit select pulses are used to sequentially enable the appropriate buffer drivers. The like outputs of the twelve buffer drivers 212–223 are connected together and the resultant four lines 224–227 are the input to the BCD to seven segment cathode decoder driver 228.

Flip flop 229 and counter 230 are used to count the number of characters being displayed and to provide a leading zero depression feature. The number of characters being displayed is continually compared with the output of the anode digit position counter 194 by a four-bit magnitude comparator 231. Anytime the anode digit position count exceeds the display character count the display is blanked. When the display has been cleared, a zero is displayed in the rightmost digit position (position 1). The flip flop 229 is used to prevent the first character sent to the display section from upsetting the displayed characters counter 230. The display is cleared by sensing a hexodecimal value of F at the input.

Figure 19:
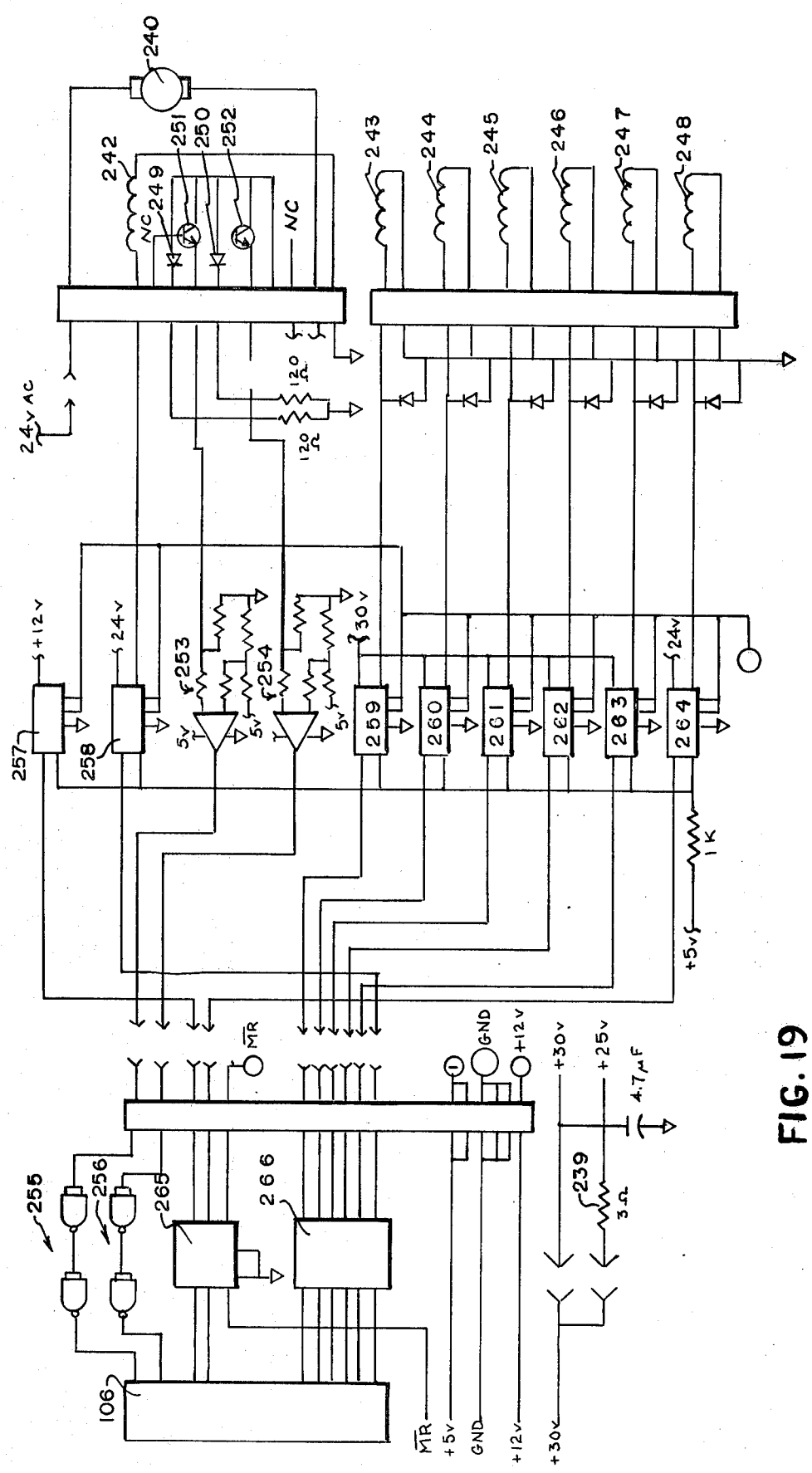
FIG. 19 is a circuit diagram of the printer interface.

Referring now to FIG. 19, the printer interface circuit will be described. The printer interface contains the paper tape printer 82 (FIG. 8) and the necessary circuitry to connect the printer to the microprocessor unit section. The printer has a drive motor 240, a solenoid coil 242 to control the paper feed, solenoid coils 243–247 to control the printing hammers, and a solenoid coil 248 to change color of the printer.

The printer uses a rotating drum and on the fly impact printing techniques. Each print hammer spans three columns, each column having numerals 0 through 9 and two mathematical marks which are not used in the system of this invention. There are five print hammers for a total of fifteen columns. The system of this invention employs columns 1 through 12.

Associated with each row of characters on the drum is a character pulse signal. Once, during each drum revolution, a reset pulse is generated. These two signals (character and reset) are generated by light emitting diodes 249 and 250 and photo transistors 251 and 252, for the reset and character pulses, respectively.

The printer power supply provides an unregulated 30-volt DC to the print hammers and a 24 volt AC to the drum motor. A dropping resistor 239 off the 30 volt supply provides approximately 24 volts DC to the color change solenoid 248 and to the paper feed solenoid 242. The character pulse and reset pulse are each fed to a comparator stage, 253 and 254, respectively. Each is formed of a voltage divider circuit and operational amplifier to amplify and convert the signals into pulse signals which are fed to Schmidt trigger circuits 255 and 256, each circuit of which comprises a pair of serially connected NAND gates with joined input terminals to shape up the leading and trailing edges of the pulses. The reset pulse provides the CA1 interrupt signal while the character pulse provides the CB1 interrupt signal. The eight data lines PB0-PB7 are used for output only and each line controls one of the solenoid driver devices 257–264.

The entire operation of the printer interface circuit is under program control. The operating system stored in PROM 102 includes a printer routine that performs all the necessary logic operations. The two interrupt inputs CA1 and CB1 to the microprocessor unit contain the necessary information for the printer routine. The printer power supply is turned on by the microprocessor unit section when there is data to be printed. At this time 24 volts AC is applied to motor 240 and the solenoid driver voltage is applied. Drum rotation causes the generation of the two interrupt signals which give the relative drum position to the printer software routine.

Printing of the data begins when the printer routine receives the second reset pulse signal and the printer begins outputting data on the eight program interface adapter 106 data lines which signal the various printer hammers to fire and also signal the paper advance and color change solenoid drivers to fire.

When all the data has been printed, the printer routine turns the power supply off. The printer power supply contains a circuit breaker on the 30 volt DC supply line to prevent damage to the printer solenoids in the event of a failure.

Figure 20:
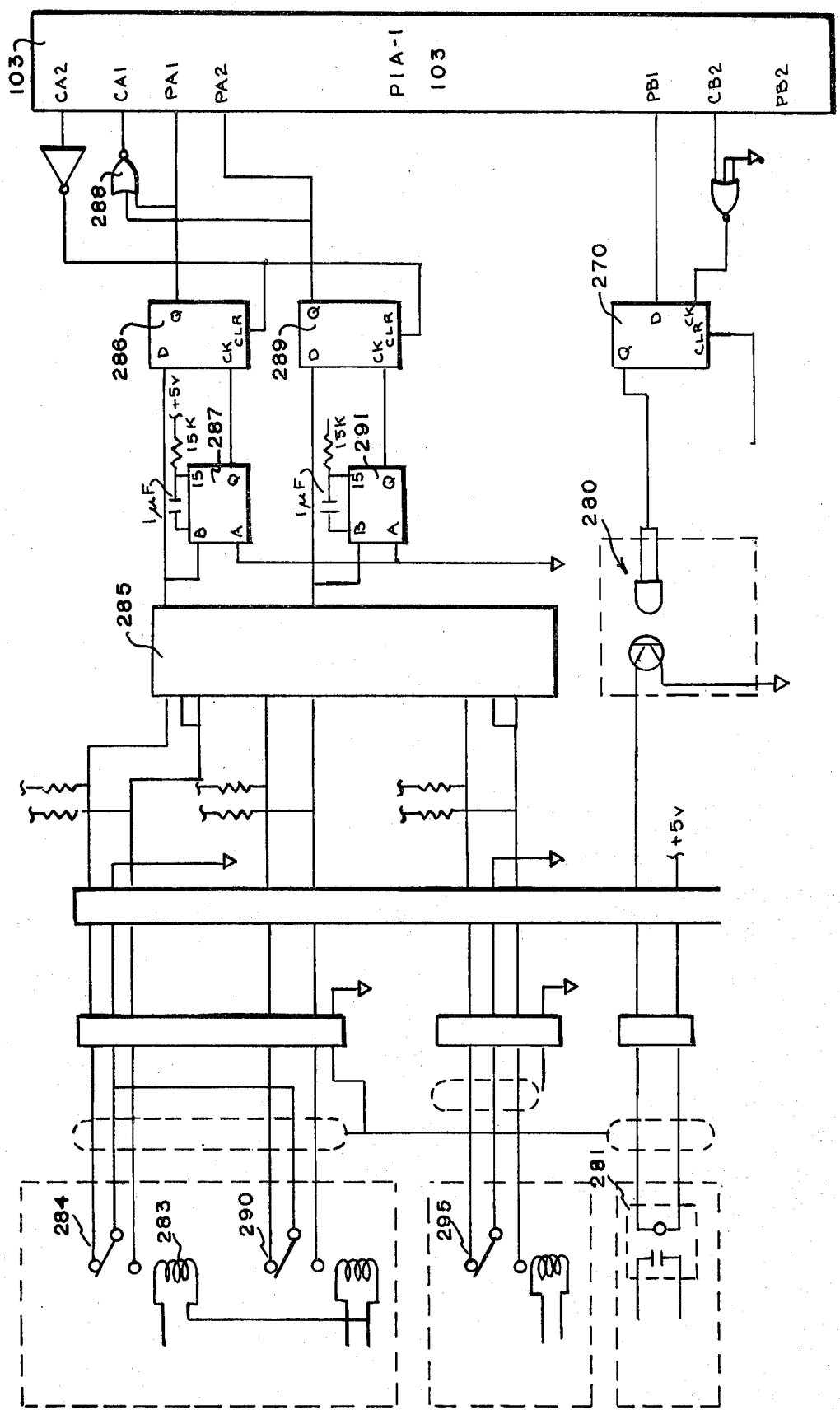
FIG. 20 is a schematic diagram of the output interface.

The output interface shown in FIG. 20 provides the necessary circuitry to connect the microprocessor unit to external devices such as the hard copy printer 10 which is inhibited by the microprocessor unit section until certain conditions have been met. Assuming the proper conditions have been satisfied, the microprocessor unit section sends an enable signal to the output interface section. Data bit PB1 from peripheral interface adapter 103 goes to a logic 1 which, with the output signal CB2, causes flip flop 270 to set. The output of flip flop 270 is fed to a peripheral driver 280 which controls a solid state, optically coupled relay 281 in the hard copy printer 10. Closure of the relay 281 contacts connects the start print switch to the start print circuitry within the hard copy printer 10 to enable the machine for use.

The coil 283 of relay 284 is connected to the copy count meter so that every time the copy count meter is implemented the contacts of relay 284 are switched. The resulting signal is fed to a S-R latch 285 which debounces the contacts. The output of the S-R latch 285 is fed to the D input of flip flop 286 and also to a monostable multivibrator 287. The output of the multivibrator 287 is a pulse of approximately 10 MS which is used to clock the flip flop 286. The multivibrator 287 is used to improve noise immunity in the circuit by rejecting spurious signals.

The output of flip flop 286 is fed to the PA1 input of the peripheral interface adapter 103 and also to the input NOR gate 288. The output of NOR gate 288 is the CA1 interrupt signal used to indicate a data ready condition to the microprocessor unit section. The microprocessor unit 100 now reads the peripheral interface adapter 103 getting the copy count data resetting flip flop 289. This entire operation repeats itself each time a copy count meter is incremented. The total number of copies is determined by the operating system software.

When the hard copy duplicator 10 has finished making all the copies requested, it goes into a shut-down mode. This causes relay 290 to energize which sends a signal to section 2 of S-R latch 285. This signal is handled exactly the same way as the copy count signal was by flip flop 289 and a second monostable multivibrator 291. When the microprocessor unit 100 reads the shut down (cycle complete) signal from the peripheral interface adapter 103 it turns data bit PB1 off which inhibits the start switch in the hard copy copier 10.

Referring now to FIGS. 21 through 23, the structure and operation of the casette interface is depicted. In the block diagram of FIG. 21, there is shown a peripheral interface adaptor 104 which includes an input B side from the mircoprocessing unit and an output A side which is linked to the cassette recorder. Signal lines CA1 and CB1 are used for interrupt control of the peripheral interface adaptor and the driver 301 and the two to one multiplexer 302 are adapted to respond to a negative signal at CB1 and CA1 respectively. CA2 and CB2 are used as outputs by the controller 300 to read information from the peripheral interface adaptor 104 and to clear registers when information has been excepted by the mircoprocessing unit. These outputs are utilized in the write strobe with E restore mode. An encoder and decoder logic unit 303 effectuates parallel to serial and serial to parallel conversion for communication between the peripheral interface adaptor of FIG. 21 and the tape transport unit. The driver unit 301 connected to the B side of adaptor 104 is used to increase the drive capabilities of the peripheral interface adaptor signals.

Figure 25:
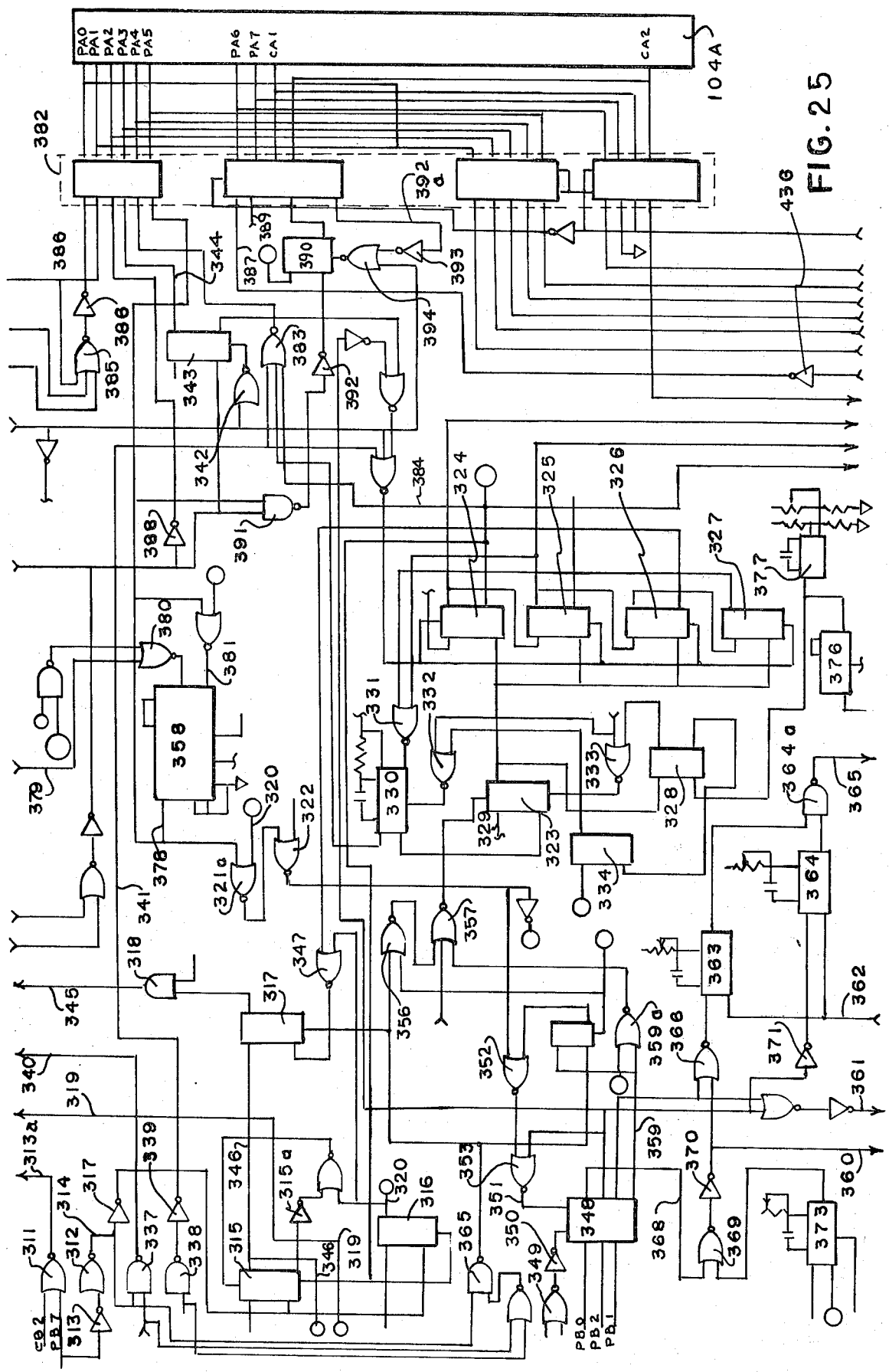

The controller logic 300 is depicted in block form in FIG. 22 and in greater detail in FIG. 25 and is the logic used to control the tape transport, the sequence of the states of operation and generation of the status condition of the system mode. The controller logic 300 includes a word decoder 304 which employs a pair of NOR gates 311 and 312 connected to the input lines CB2 and PB7 of the B side of the peripheral interface adaptor 104. An inverter 313 inverts the state of the input at PB7 to the NOR gate 312. The word decoder 304 generates a strobe pulse to the encoder and decoder logic of FIG. 23 or to the remaining circuitry of the control logic of FIG. 22 depending upon the state of PB7. When CB2 is low, the status of PB7 is sampled by the NOR gates 311 and 312 A data read signal 313a is sent to the encoder and decoder logic of FIG. 18 if the state of the input at PB7 is equal to zero. On the other hand, a command read signal 314 is generated by the word decoder 304 within the controller logic of FIGS. 22 and 25 when PB7 is equal to one. The command read signal 314 acting through an invertor 317 appears at the C inputs of a right/read C-D flip flop 315 and an erase C-D flip flop 316. The command read signal 314 thereby strobes in the control bits at PB6 and PB3 to the mode control 319. This establishes whether a right or read function is to occur and whether or not the tape is to be erased. If a right function is signalled, the flip flop 315 strobes another flip flop 317 in the mode control 309 to provide one input to AND gate 318. If a read function is selected, the output is indicated as a NOT WRITE MODE signal on line 319. The output at 320 from the erase flip flop 316 acts through a pair of NOR gates 321a and 322 to clock a state changing flip flop 323 in the state sequence logic circuitry 305. The Q output of the flip flop 323 clocks a state one flip flop 324 to advance to act as an input a state 2 flip flop 325. This increments the condition of the state sequence logic 305 from its initial state 1 to the second state 2.

The state sequence logic 305 includes a four bit ring counter formed by the flip flops 324, 325, 326 and 327. The ring counter is cycled from an intial state 1 in which the output of flip flop 324 is high, through subsequent states two through four in which the outputs of the flip flops 325, 326 and 327 are respectively high. At the termination of state four the recounter is reset to state 1. Two sequence control flip flops 323 and 328 are used to generate the clock pulse for the ring counter. The control flip flop 323 is set by a signal on the preset input at 329 or by the start/stop timer 330 timing out. The timer 333 is a monistable multivibrator with a Schmidt trigger input from NOR gate 331 and with a clearing input from NOR gate 332. The control flip flop 328 is used to reset the control flip flop 323 through a NOR gate 333. An additional flip flop 334 is used to generate a reset pulse to the timer 330 through the NOR gate 332 during the read mode only. By clearing the timer 330 during the read mode by virtue of the signal from flip flop 334, the duration of state 2 is shortened so that no data will be missed if it occurs within 50 miloseconds of start up. Otherwise, the timer 330 establishes a 60 milosecond duration for state 2 to allow the tape to reach speed.

The reset decoder 306 of FIG. 22 includes two NAND 337 and 338 which respectively respond to the inputs PB4 and PB5 from the B side of the peripheral interface adaptor 104. An invertor 339 inverts the output of NAND gate. The reset decoder 306 generates a reset pulse to either the tape transport on line 340 or to the status generator 308 on line 341, or both. This determination is made depending upon whether PB4 and PB5 are high at the time the AND gates 337 and 338 receive the command read signal 314. Reset pulses to the tape transport on line 340 clear the shut down state of the transport. Pulses to the NOR gate 342 in the status generator 308 clear the EOT/BOT (end of tape/beginning of tape) flip flop 343, thus clearing the flag signal 344 therefrom. In the mode control 309, bits PB6 and PB3 are sampled by flip flops 315 and 316 respectively when a command read signal 314 is received. The state of these bits determines whether the read or write mode is selected. The default mode is the read mode so no change is made if PB6 is zero. The mode control 309 controls the write mode output 346 and the write data block 345 emanating from the NAND gate 318 to the tape transport. Also, the write mode signal 346 and the not write or read mode signal 319 are sent to other parts of the system.

In the write mode, the write/read flip flop 315 is set high which sets the write mode signal and write mode line 319 low. The write data block signal 345 is brought low at the end of state 2, then set high after state 3, as established by the state sequence logic 305. In the erase mode, the erase flip flop 316 is set when PB3 is high. This in turn presets the read/write flip flop 315 which sets the write mode line 346 low. The write data block signal 345 is then prevented from going low by inhibiting the pulse to the clock input to the flip flop 317 through the NOR gate 347.

The motion control circuit 307 is built around a four bit priority latch register 348. This latch is cleared during state 1 and state 4 by applying the Q output signals from the flip flops 324 or 327 to the NOR gate 349, the output of which is inverted by an invertor 350 and applied as an input to the latch 348. Data is latched into the register 348 when the strobe input 351 is low, as developed by the NOR gates 322, 352 and 353. Initially the status of the register 348 is cleared during state 1 and state 4 by the signal from the invertor 350. The leading edge of the command read pulse 314 acts through the NAND gate 355 and the NOR gates 357a and 357 to clock the flip flop 323 to increment the controllor into state 2. This releases the clear input from the inverter 350, leaving the register in the unlatched condition. The trailing edge of the command read signal sets the flip flop 356 which latches the motion bit appearing at PB0, PB1 or PB2 into the register 348. The register is unlatched if the controller of FIGS. 22 and 25 is in state 3 and either the erase mode output 320 of erase flip flop 316b is set or if the gap signal is set by the gap detector 358. Either of these conditions will act as an input to the NOR gate 321a which, through NOR gates 322, 352 and 353 provide a signal at strobe input 351. The unlatched condition is gated with the output at 359 from the register 348 of the motion control circuit 307 generating a high state to increment the state sequence logic 305. When all of the outputs of the register 348 are zero, the signal at 359 will equal zero. This will cause the output of the NOR gate 359a to go high, which initiates an increment pulse to the state sequence logic 305. This method is used to terminate the read and erase modes.

The speed control section 310 controls the direction and speed of the tape by controlling the appropriate signals to the tape transport forward go signal 360 and reverse go signal 361 serve as inputs to the tape transport to select the direction of tape movement. The speed is controlled by the width of the pulse on one of two speed input leads 362 and 365. One of these leads carries a speed control signal which is generated by either of two one shot multivibrators 363 or 364. The multivibrator 363 fires for thirty microseconds to provide a low speed signal of ten inches per second. The high speed multivibrator fires for thirty-seven microseconds to provide a signal to drive the tape at eighty inches per second. The forward command 368 acts through the NOR gate 369, the invertor 370 and the NOR gate 366 to drive the low speed one shot 363. The reverse command acts through the invertor 371 to enable the high speed one shot 364. Another one shot 373 is used during the write mode to delay the determination of tape motion by ten miloseconds to allow the last recorded bit to pass the read head.

The write clock generator 314 employs a counter chip 376 to generate a 16 KHz squarewave for the tape transport used for timing when recording data. The counting chip 376 is driven by a timer circuit 377 that also provides a reset signal to the flip flop 328 in the state sequence logic 305.

A gap detector 358 is provided in the form of a four bit conunter which is enabled only during the read mode. Initially the gap detector output 378 is set high. The first read clock pulse 379 acts through the NOR gate 380 and clears the counter 358 indicating no gap. Each time a read clock pulse 379 is received the counter 358 is reset. The prerecorded clock pulses at 381 are counted by the gap detector 358. The condition for gap is when eight prerecorded clock pulses without a read clock pulse 379 occurring.

Figure 24:
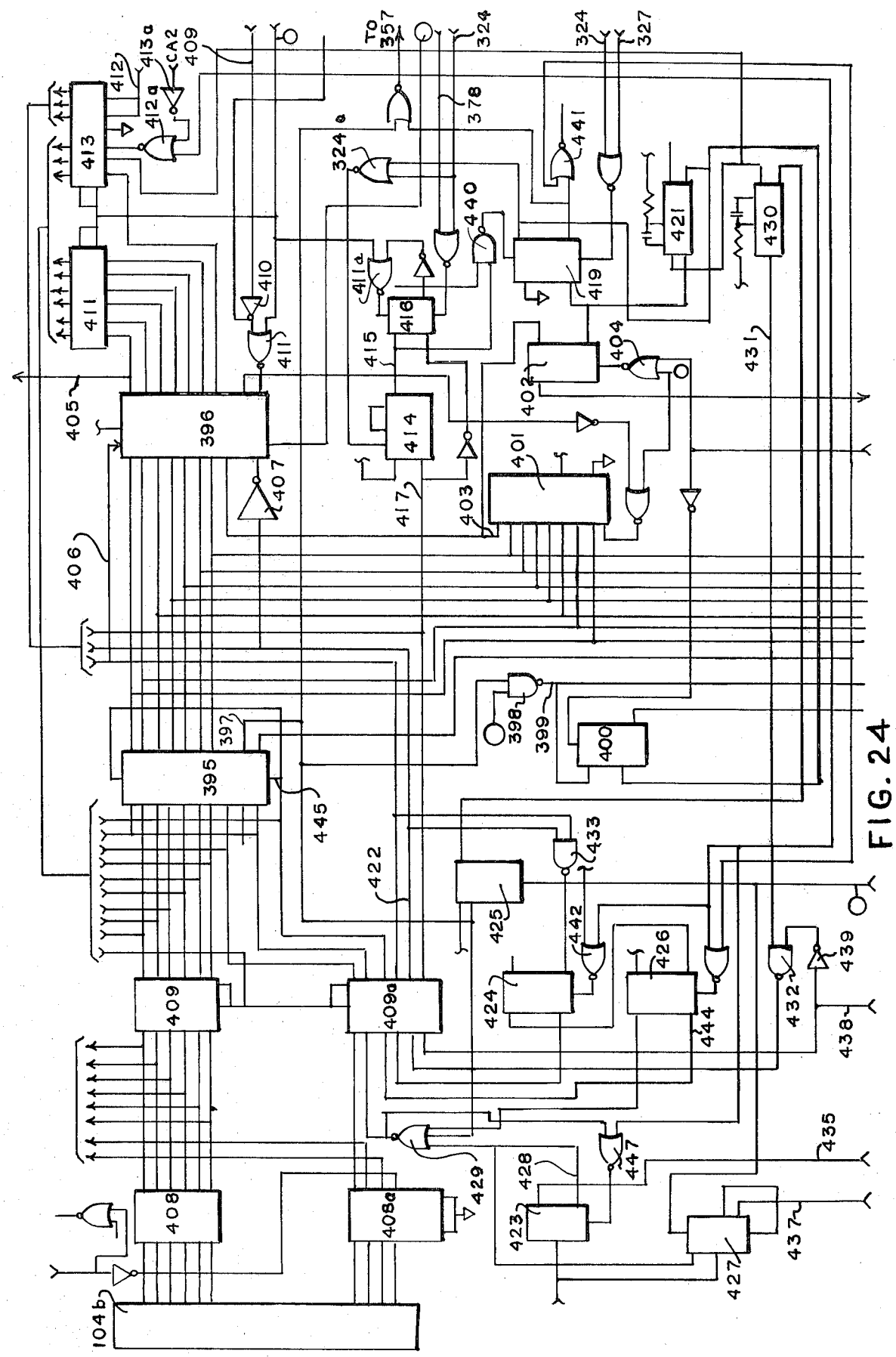
FIGS. 24 and 25 are the circuit diagram of the cassette interface of the system.

The status generator 308 generates the bits for the status word which is passed through a two to one multiplexer 382 to the A side of the peripheral interface adaptor 104. The status generator 308 includes a series of NAND gates, NOR gates and invertors coupled together to provide the appropriate inputs as indicated in FIG. 25. A unit ready bit is provided by the output of NOR gate 383 if, and only if, the cassette is loaded, write tab is in place and the controller is in state 1. If either the cassette is not loaded or the write tab is removed. The ring counter of the state sequence logic 305 will stay in state 1, thus maintaining an input to NOR 383 on lead 384. Status conditions from the encoder and decoder logic circuitry of FIGS. 23 and 24 are used to generate an error signal through NOR gate 385 and invertor 386 in the status genreator 308. The error bit is set if there is an over flow or parity. Parity is checked only during the read mode. A buffer ready signal 387 transmitted to the two to one multiplexer 382 is used to indicate when the controller of FIG. 22 is ready to accept data during the write mode. The clear leader signal, indicated in the status generator 308 at the output of the invertor 388 indicates the status of the optical detector in the transport. The gap detector output 378 shows the state of the counter 358 while the bit at 389 to the two to one multiplexer 382 is held high to set the word identification bit. The EOT/BOT flag 344 is set when a hole is detected by the optical detector. The flag 344 remains set until it is reset by the microprocessor. A flip flop 390 is used to set IRQA1 when a gap BOT/EOT hole is detected during a read operation by means of signals transmitted through a NOR gate 391 and an invertor 392. The flip flop 390 is reset by the acknowledge pulse 392a acting through the invertor 393 and the NOR gate 394.

The encoder and decoder logic is depicted in FIGS. 22 and 23, but also communicates with the A side of the peripheral interface adaptor 104 of FIG. 21 through the two to one multiplexer 382 in FIG. 25. With reference to FIGS. 22 and 23, the word buffer 320 and shift register 321 are connected differently in the read and write mode. All timing and data signals to the buffer 320 and shift register 321 are changed by the two to one multiplexer 382 in FIG. 25. The state of the multiplexer 382 is controlled by the read mode signal 319.

The word buffer 320 consists of an eight bit register 395. Data is clocked into the register either from the A side of the peripheral adaptor 104 or from the output of the shift register 321, which is an eight bit bi-directional shift register chip 396. The output 397 of the buffer 395 is used as a register full signal, and is used as a status bit by other sections. The register full signal 397 is gated with the read mode signal 319 from the mode control 309 of the control logic 300 at an NAND 398. The output of NAND gate 398 is a buffer ready signal 399 which is enabled only in the read mode and which controls the two to one multiplexer 382 that is connected to the A side of the peripheral interface adaptor 104 in FIG. 25. The output of the NAND gate 398 operates through a flip flop 400 to produce a read overflow error if the system is the read mode and if the word buffer 395 is full an a strobe pulse to load the buffer is generated.

The parity generator and detector 323 in FIG. 23 includes a nine bit odd/even parity generator chip 401 and a parity detector flip flop 402. In the write mode, the parity bit is generated at 403 by the parity generator chip 401 and strobed into the shift register 396 along with the data bits. During the read mode, all eight bits are monitored when the word buffer 395 is loaded from the shift register 396. The parity detector flip flop 402 is set if parity is wrong. The parity error flip flop 402 is only enabled during the read mode and cleared through a NOR gate 404 by the state 2 signal from the flip flop 352 in the state sequence logic 305 in FIG. 25.

In write mode, data is loaded from the word buffer 395 and transferred to the tape transport serially at the output 405 of the shift register chip 396. Data is loaded by setting the input 406 to the shift register chip 396 low and clocking the shift register through the invertor 407. The load signal and load clock are generated by the write control logic 325 which includes four six bit registers 408. During the read mode only the shift mode of the shift register 396 is used. Data from the tape transport is enabled and shifted in on the line 409 from the tape transport through an invertor 410 and a NOR gate 411. Data is clocked into the shift register 396 from the tape transport by the read clock signal 412 acting through the read module 413 to provide a signal through the invertor 407 to the shift register chip 396. After every eighth bit, the data word is loaded into the word buffer 395.

The bit counter 324 is depicted in FIG. 24 and includes a four bit counter chip 414. The output 415 of the counter chip 414 is connected to a flip flop 416. The flip flop 416 is used only when reading the first word of a data block. The first word of a block is formed by counting nine clock pulses at 417 to the counter chip 414 to ignore the leading zero bit of a block. Once the flip flop 416 is set, it remains in that state until state one or a gap is detected through the NOR gate 418.

Whenever a word has been assembled, a strobe pulse is generated by a flip flop 419 acting through a NOR gate 324a connected to the clocking input of the bit counter 414. The strobe pulse to the bit counter 414 is generated by presetting the flip flop 419 with a high output, and clocking it low by delaying the output of the flip flop 419 with a one shot multivibrator 421. In the read mode, the strobe pulse output from multivibrator 421 is used to load the word buffer 395 through the read module 413. During the write mode, the strobe pulse is used by the write control logic 325 to generate the load signal and clock output 422 through the multivibrator 430 as an output of the six bit counter 408.

The write control logic 325 generates the required signal to load the register 396 when a data read or strobe pulse is received as a clocking input to the flip flop 423. Initially, all of the flip flops 423, 424, 425, 426 and 427 are cleared. The data read pulse acting as a clocking input to the flip flop 423 sets the flip flop 423 using it to generate a clock pulse at 428 for the word buffer 395. If the word buffer is empty, the pulse is allowed to clock data into the word buffer 395 and reset the clock pulse flip flop 423. When the buffer 395 is full, the register full signal 397 appears and clocks the first load flip flop 425 and disables the clock NOR gate 429. The output of the first load flip flop 425 enables the one shot 430 and initiates a pulse therefrom at 431. With the shift full flip flop 424 is cleared so that the input to the shift register 396 from the invertor 407 is high, the pulse from the one shot 430 clocks the data from the word buffer 395 to the shift register 396. The clock 431 also sets the shift full flip flop 424 through the NOR gate 442. The shift full flip flop 424 goes low, setting the shift register chip 396 in the shift mode. With the shift full flip flop 424 high, the not Q output clears the word buffer 395. The register clear flip flop 426 is reset when the register full signal at 397 is reset.

The next read data pulse to the flip flop 423 sets the flip flop 423 which generates another word buffer clock pulse through the invertor 407 to transfer data from the peripheral interface adaptor 104, side A, to the word buffer 395 and also clears the clock pulse flip flop 423. With the register full signal from the flip flop 426 set, the clock NOR gate 429 is disabled. The third read data pulse sets the clock pulse flip flop 423 which remains set and the clock NOR gate 429 is disabled. The clock pulse flip flop 423 also generates the buffer ready full signal at 435, which is transformed to the buffer ready signal through the invertor 436 in the control logic circuit of FIG. 25. With the clock flip flop 423 set, the signal 435 is high so that the buffer ready signal at the output of invertor 436 is low indicating that the controller of FIG. 22 and 25 is not ready to accept data. If another data read signal is received by the flip flop 427, the not Q output 437 therefrom will be set. This signal is the write overflow signal and indicates that the last word in the peripheral interface adaptor 104 is lost.

Whan state three is entered, the controller will start receiving shift data in pulses at 438 from the tape transport. The shift data in pulses act through the invertor 439 to the input of the NAND gate 432. The shift data in pulses 438 clock data out of the shift register through the invertor 407 and increment the bit counter 414 by means of a clock input 417. The strobe output 415 is transmitted through a NAND gate 440 to set a flip flop 419. The output of the flip flop 419 acts through a NOR gate 441 as an input to another NOR gate 442 to the shift full flip flop 424. The output of NOR gate 442 resets the shift full flip flop 424. The shift full flip flop 424 being reset changes the status of the shift register 396 into the load condition and locks data from the word buffer 395 by the delayed strobed pulse from NOR gate 442. The shift full flip flop 424 initiates a clear signal to the word buffer 395 by clocking the register clear flip flop 426, the not Q output of which at 444 is transmitted through the register 409a to the clear input 445 of the buffer 395. In addition, the Q output of the flip flop 426 enables the clock pulse NOR gate 429. With the NOR gate 429 enabled and the clock pulse flip flop 423 set, clock pulses at not Q output 428 of the clock flip flop 423 are allowed to strobe data into the word buffer 395. The clock flip flop 423 is cleared by the output of NOR gate 429 acting through NOR gate 447. With the clock pulse flip flop 423 cleared, the buffer ready signal to the two to one multiplexor 382 is high, requesting data from the microprocessor.

Figure 26:
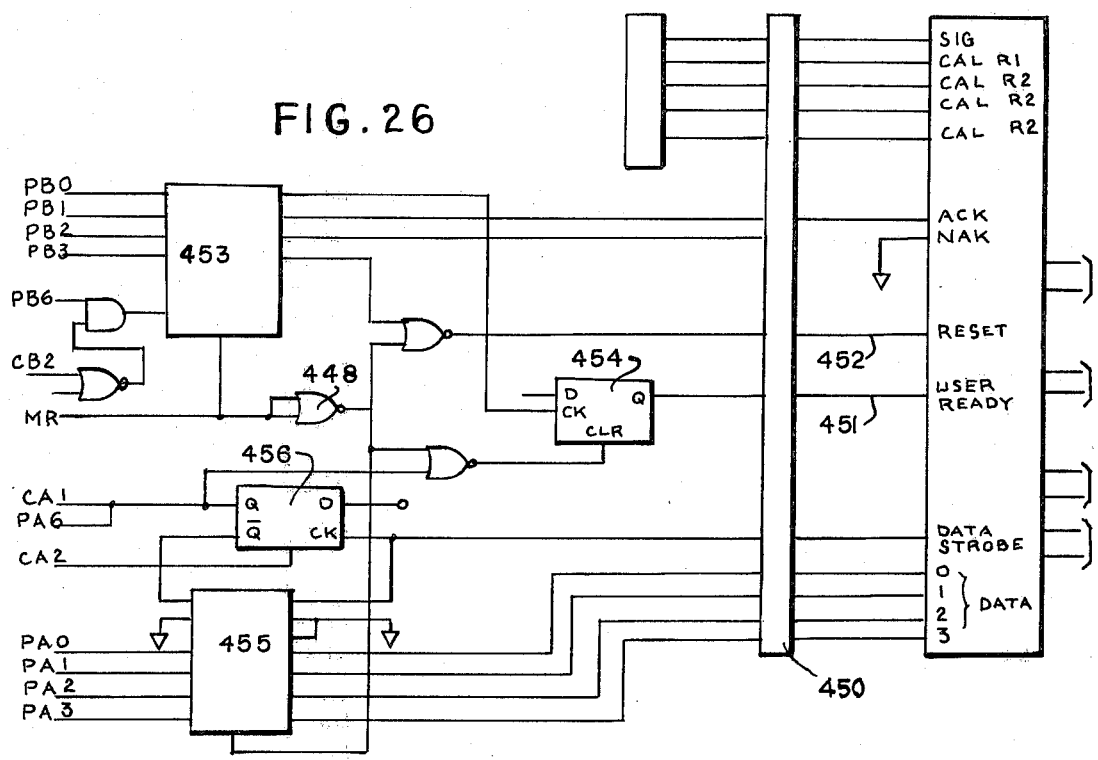
FIG. 26 is a circuit diagram of the bar code reader interface.

FIG. 26 is the circuit diagram for the bar code reader interface. The bar code reader is a complete system that consists of a hand held light pin 43 (FIGS. 6 and 7) and a decoding logic printed circuit board with a printed circuit board connector 450. The light pin 43 contains a LED source and reflective sensor assembly in its associated signal conditioning circuitry. The signals generated by the light pin in response to reading bar coded indicia are fed to the decoding logic printed circuit board. The decoding logic uses its own microprocessor system to convert the signals from the light pin to a usable output. The Identicom Model 600 Pin Reading System is a commercially available reading system employed in the invention and is supplied with its own operational manual having a complete description on the operation and use of the bar code reader.

Two commands from the microprocessor unit section are used to control the operation of the bar code reader; the user ready signal (line 451) enables the bar code reader and is used to clock the data out after a read operation has been performed; and the reset signal (line 452) is used to clear the decoding logic after the data has been passed to the microprocessor unit section and during system initialization. The commands are scored in a quad latch 455. The action of the reset command is straight forward.

The user ready command causes the flip flop 454 to set which applies a logic one to the user ready input of the decoding logic. This signal remains high enabling the bar code reader until a read operation has been performed and the data is ready to be output. At this time the data strobe signal goes low and returns high, clocking the four-bit data word output of the decoding logic into the quad latch device 455. The data strobe signal also causes flip flop 456 to set. The output of flip flop 456 clears the user ready signal, sets the interrupt signal CA1, sets the address bit PA6 and enables the tristate output of the quad latch 455. The microprocessor unit 100 responds to the interrupt signal and reads the data stored in the quad latch 455. As a result of the microprocessor unit read operation, signal CA2 goes low, momentarily, and then returns high. This clears flip flop 456 which turns off the output of the quad 455. The microprocessor unit 100 then sends the user ready command which causes the entire cycle to be repeated. This operation is repeated until the last data word has been passed from the decoding logic to the microprocessor unit section. The decoding logic signifies the end of coded information by sending the hexadecimal character D to the microprocessor unit section. The nominal hexadecimal character D is the four low order bits of the ASCII character CR (Carriage Return). The data output of the bar code reader is actually an eight-bit ASCI character.

The microprocessor unit section senses the end of coded information and begins processing that information. At the proper time the microprocessor unit section sends the user ready command to the bar code reader to enable it for the next read operation.

Figure 27:
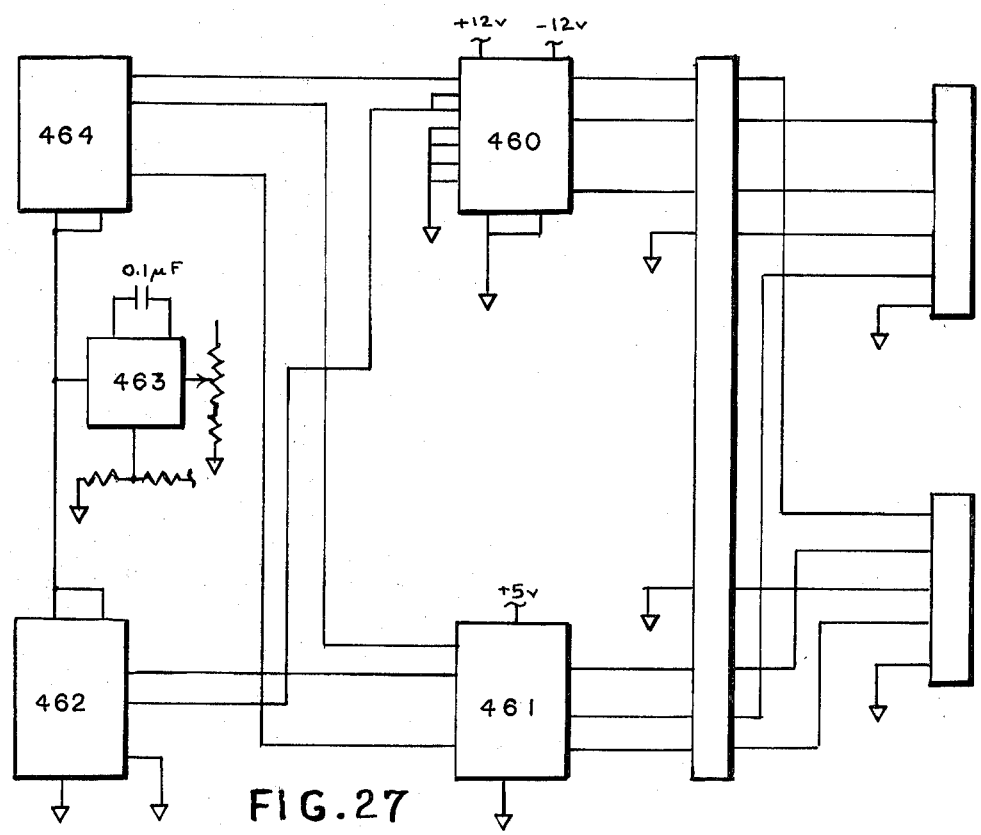
FIG. 27 is a circuit diagram of the EIA interface of the system.

Referring now to FIG. 27, there is shown a schematic diagram of the Electronics Industry Association Interface Section. This Section allows an external telecommunications device to be connected to the transaction accounting system in accordance with the provisions of the EIARS-232C specification on interconnected telecommunications equipment. Devices 460 and 461 provide the necessary shifting to convert the telecommunications level signals to PTL level signals used by the ACIA, device 462. A voltage controlled oscillator 463 provides the data rate for the interface. The nominal frequency of oscillator 463 is adjusted to 4.8 KHC which is sixteen times the 300 band data rate. The ACIA 412 uses a divide by sixteen clock ratio for improved noise immunity.

The invention has been described with reference to the presently preferred and illustrated embodiment. It is not intended that the invention be unduly limited by this disclosure. Instead, the invention is intended to be defined by the means and their obvious equivalents set forth in the following claims.

TABLE 6

| Element | Part No. | Description | Manufacturer |
|---|---|---|---|
| 91 | 203-1-2334-1 | Circuit Breaker | Airpax Electronics |
| 94 | 5K1 | EMI Filter | Corcom |
| 95 | ET-401-11 | Power Supply | ACDC Electronics |
| 96 | EC5N3-1 | Power Supply | ACDA Electronics |
| 100 | MC6800L | Microprocessing Unit | Motorola |
| 101 | MCM6810AL | Random Access Memory | Motorola |
| 103–106 | MC6820L | Peripheral Interface Adapter | Motorola |
| 107 | MC7850L | Asynchronous Communications Interface Adapter | Motorola |
| 112 | MC6870A | MPU Clock Module | Module |
| 102 | C2708 | Eraseable Programmable Ready Only memory | Intel |
| 114–116 131,132 | SN74365N | Bus Driver | Texas Instruments |
| 130 | SN74367N | Bus Driver | Texas Instruments |
| 122,122a | SN74S04N | Hex Inverter | Texas Instruments |
| 124 | SN74H21N | Dual 4-Input and Gate | Texas Instruments |
| 127 | SN7410N | Triple 3-Input Nand Gate | Texas Instruments |
| 133 | SN74121N | Monostable Multivibrator | Texas Instruments |
|  | SN74S00N | Quad 2-Input Nand | Texas Instruments |
|  | SN7425N | Dual 4-Input Nor Gate | Texas Instruments |
| 148 | SN74175N | QUAD D Flip-Flop | Texas Instruments |
| 145 | Sn74173N | 4 Bit D Register | Texas Instruments |
| 140 | SN74147N | 10 to 4 Priority Encoder | Texas Instruments |
| 150a 150b | SN75452B | Dual Peripheral Driver | Texas Instruments |
| 146 | SN7432N | Quad 2-Input or Gage | Texas Instruments |
| 257–264 | DH0028CN | Hammer Driver | National Seml. |
| 253,254 | SL 324 | Quad OP Amp | National Seml. |
| 255,256 | SN74132N | Quad 2-Input Nand Gate | Texas Instruments |
| 265,266 | SN74367N | Bus Driver | Texas Instruments |
| 433,337 364a | SN7400N | Quad 2-Input Nand Gate | Texas Instruments |
| 447,412a 324a,411a 348a, 349 311,394 | SN7402N | Quad 2-Input Nor Gate | Texas Instruments |
| 313,407 413a, 392 315a | SN7404N | Hex Inverter | Texas Instruments |
| 447a | SN7427N | Triple 3-Input Nor Gate | Texas Instruments |
| 323,402, 315,317 424,424a 423,402a 400,426 427 | SN747N | Dual D Flip-Flop | Texas Instruments |
| 377 | SN74124N | Voltage Controlled Oscillator | Texas Instruments |
| 395 | SN74175N | Quad D Flip-Flop | Texas Instruments |
| 401 | SN74180N | Parity Generator | Texas Instruments |
| 357,376 417a | SN74197N | Binary Counter/Latch | Texas Instruments |
| 396 | SN74198N | 8 Bit Shift Register | Texas Instruments |
| 421,430 363,364 | SN74221N | Monostable Multivibrator | Texas Instruments |
| 348 | SN74278N | 4 Bit Priority Register | Texas Instruments |

TABLE 6-continued

| Element | Part No. | Description | Manufacturer |
|---|---|---|---|
| 411a,413 408,409 408a, 409a | SN74367N | Bus Driver | Texas Instruments |
| 382,295 | 623-687V | Relay SPDT 115 Vac Coil | Cornell Dubilier |
| 291 | 603-686V | Relay SPDT 12 VDC Coil | Cornell Dubilier |
| 284,290 | 20317-84 | Relay SPDT 115, Vac Coil | Deltrol Controls |
| 281 | GB15205 | Solid State Relay | Grigsby Barton |
| 288 | SN7427n | Triple 3-Input Nor Gate | Texas Instruments |
| 286,289 270 | SN7474N | Dual D Flip-Flop | Texas Instruments |
| 287 | SN74221N | Monostable Multibrator | Texas Instruments |
| 285 | Sn74279N | S-R Latch | Texas Instruments |
| 280,294 | SN75452B | Peripheral Driver | Texas Instruments |
| 166 | SN7474N | Dual D Flip-Flop | Texas Instruments |
| 65–68, 61,64 | 1SN1A2 | Switch | Microswitch |
| 52,62,63 | 1SN3D2 | Indicator Module | Microswitch |
| 51 | W12-0003 | 12 Digit Display Panel | Cherry Electric |
| 190 | VC-525 | DC To DC Converter | Beckman |
| 196,197 | DM8897 | Anode Driver | National Seml. |
| 228 | DM8880 | Cathode Decoder/Driver | National Seml. |
| 186 | SN7404N | Hex Inverter | Texas Instruments |
| 187 | SN7408N | Quad 2-Input and Gate | Texas Instruments |
| 189 | SN7428N | Quad 2-Input Nor Driver | Texas Instruments |
| 229 | SN7474N | Dual D Flip-Flop | Texas Instruments |
| 231 | SN7485N | 4 Bit Magnitude Comparator | Texas Instruments |
| 198,199 | SN74123N | Monostable Multivibrator | Texas Instruments |
| 195 | SN74154N | 4 to 16 Decoder | Texas Instruments |
| 194 | SN74161N | Synchronous Counter | Texas Instruments |
| 200–211 | SN74125N | Quad D Flip-Flop | Texas Instruments |
| 212–232 | SN74365N | Bus Driver | Texas Instruments |
| 43 | Model 610 | Optical Pen Reading System | Identicon |
| 453 | SN74175N | Quad D Flip-Flop | Texas Instruments |
| 455 | SN74173N | 4 Bit D Register | Texas Instruments |
| 449 | SN7402N | Quad 2-Input Nor Gate | Texas Instruments |
| 448 | SN7474N | Dual D Flip-Flop | Texas Instruments |
| 447 | SN7408N | Quad 2-Input and Gate | Texas Instruments |
| 169 | 12SW3-19 | Keyboard | Microswitch |
| 179 | SN74150N | Data Selector/Multiplexer | Texas Instruments |
| 178 | SN74161N | Synchronous Counter | Texas Instruments |
| 180 | SN74173N | 4 Bit D Register | Texas Instruments |
| 168 | SN7400N | Quad 2-Input Nand Gate | Texas Instruments |
| 181 | SN74122N | Monostable Multivibrator | Texas Instruments |

I claim:

1. An information coded paper document comprising:
 (a) a paper base sheet;
 (b) a plurality of invisible, electrically conductive, substantially parallel bands on said base sheet and having information coded thereon in units of specific electrical conductivity modified in accordance with an intelligence code;
 (c) visual indicia on said base sheet and
 (d) wherein said document may be reproduced by a compatible document copier which senses the coded information thereon.

2. The document of claim 1 wherein:
 said bands are formed by electrically conductive impregnants in said paper base sheet.

3. The document of claim 2 wherein:
 said impregnants are salts.

4. The document of claim 3 wherein:
 said salts are inorganic.

5. The document of claim 4 wherein:
 said impregnants are applied with an aqueous emulsion of a film forming polymer.

6. The document of claim 5 wherein:
 said impregnants are salts of a polyionic polymer.

7. The document of claim 6 wherein:
 said impregnants are salts of a polycationic polymer.

8. The document of claim 6 wherein:
 said impregnants are salts of a polyanionic polymer.

9. The document of claim 6 wherein:
 said bands are overlaid by a protective transparent film.

10. The document of claim 6 comprising:
 a laminate of a paper base sheet and a transparent film bearing said electrically conductive bands.

11. A document printer in combination with a transaction accounting system for accounting of copies of documents having an area of electrical conductivity, said document printer comprising platen means adapted to receive a document for display thereon and document reproduction means including blank paper feeding means, document scanning means, copy reproduction means and electric power supply means operatively connected to said document reproduction means to prepare copies of said document on blank paper, document conductivity sensing means carried by said platen means to sense the electrical conductivity of an area of said document; and switch means in said electrical power supply means to interrupt said power supply to said printer when said sensing means detects an area of electrical conductivity on said document, said transaction accounting system comprising data processing means to record, store or communicate transaction data; data input means for input of data on copyright code, transaction date, user identification or number of copies; enabling means to restore said power supply to the document reproduction means of said printer upon completion of said input data by said data input means, said enabling means requiring input of user identification and transaction date data by said data input means; and
output data terminal means to deliver transaction data for processing or transmission to a remote accounting system.

12. A document printer in combination with a transaction accounting system for accounting of copies of documents having an area of electrical conductivity, said document printer comprising platen means adapted to receive a document for display thereon and document reproduction means including blank paper feeding means, document scanning means, copy reproduction means and electric power supply means operatively connected to said document reproduction means to prepare copies of said document on blank paper, document conductivity sensing means carried by said platen means to sense the electrical conductivity of an area of said document; and switch means in said electrical power supply means to interrupt said power supply to said printer when said sensing means detects an area of electrical conductivity on said document, said transaction accounting system comprising data processing means to record, store or communicate transaction data; data input means for input of data on copyright code, transaction date, user identification or number of copies; enabling means to restore said power supply to the document reproduction means of said printer upon completion of said input data by said data input means, said enabling means requiring input of user identification and transaction date data by said data input means, and a bar code reader for reading on said document, said bar code reader comprising a hand-held wand.

13. A document printer in combination with a transaction accounting system for accounting of copies of documents having an area of electrical conductivity, said document printer comprising platen means adapted to receive a document for display thereon and document reproduction means including blank paper feeding means, document scanning means, copy reproduction means and electric power supply means operatively connected to said document reproduction means to prepare copies of said document on blank paper, document conductivity sensing means carried by said platen means to sense the electrical conductivity of an area of said document; and switch means in said electrical power supply means to interrupt said power supply to said printer when said sensing means detects an area of electrical conductivity on said document, said transaction accounting system comprising data processing means to record, store or communicate transaction data; data input means for input of data on copyright code, transaction date, user identification or number of copies; enabling means to restore said power supply to the document reproduction means of said printer upon completion of said input data by said data input means, said enabling means requiring input of user identification and transaction date data by said data input means, and a sequence mode selector control means to select a transmit sequence to reproduce, at said data processing means, previously recorded and stored transaction data.

14. A document printer in combination with a transaction accounting system for accounting of copies of documents having an area of electrical conductivity, said document printer comprising platen means adapted to receive a document for display thereon and document reproduction means including blank paper feeding means, document scanning means, copy reproduction means and electric power supply means operatively connected to said document reproduction means to prepare copies of said document on blank paper, document conductivity sensing means carried by said platen means to sense the electrical conductivity of an area of said document, said sensing means comprising a plurality of detectors placed at preselected locations on said platen means to sense the electrical conductivity of a plurality of areas of a document placed thereon and signal generating means to supply a signal therefrom to said input means; and switch means in said electrical power supply means to interrupt said power supply to said printer when said sensing means detects an area of electrical conductivity on said document, said transaction accounting system comprising data processing means to record, store or communicate transaction data; data input means for input of data on copyright code, transaction date, user identification or number of copies; enabling means to restore said power supply to the document reproduction means of said printer upon completion of said input data by said data input means, said enabling means requiring input of user identification and transaction date data by said data input means, and
indicator means associated with said data input means and indicator switch means responsive to signals from said data input means to enable the indicator means to display the operational status of the system.

15. A document printer in combination with a transaction accounting system for accounting of copies of documents having an area of electrical conductivity, said document printer comprising platen means adapted to receive a document for display thereon and document reproduction means including blank paper feeding means, document scanning means, copy reproduction means and electric power supply means operatively connected to said document reproduction means to prepare copies of said document on blank paper, document conductivity sensing means carried by said platen means to sense the electrical conductivity of an area of said document, said sensing means comprising a plurality of detectors placed at preselected locations on said platen means to sense the electrical conductivity of a plurality of areas of a document placed thereon and signal generating means to supply a signal therefrom to said input means, and switch means in said electrical power supply means to interrupt said power supply to said printer when said sensing means detects an area of electrical conductivity on said document, said transaction accounting system comprising data processing means to record, store or communicate transaction data, said means to record transaction data comprising a magnetic tape recorder, data input means for input of data on copyright code, transaction date, user identification or number of copies; and enabling means to restore said power supply to the document reproduction means of said printer upon completion of said input data by said data input means, said enabling means requiring input of user identification and transaction date data by said data input means.

16. A document printer in combination with a transaction accounting system for accounting of copies of documents having an area of electrical conductivity, said document printer comprising platen means adapted to receive a document for display thereon and document reproduction means including blank paper feeding means, document scanning means, copy reproduction means and electric power supply means operatively connected to said document reproduction means to prepare copies of said document on blank paper, document conductivity sensing means carried by said platen means to sense the electrical conductivity of an area of said document, said sensing means comprising a plurality of detectors placed at preselected locations on said platen means to sense the electrical conductivity of a plurality of areas of a document placed thereon and signal generating means to supply a signal therefrom to said input means; and switch means in said electrical power supply means to interrupt said power supply to said printer when said sensing means detects an area of electrical conductivity on said document, said transaction accounting system comprising data processing means to record, store or communicate transaction data, said means to record transaction data comprising a paper tape printer; data input means for input of data on copyright code, transaction date, user identification or number of copies; and enabling means to restore said power supply to the document reproduction means of said printer upon completion of said input data by said data input means, said enabling means requiring input of user identification and transaction date data by said data input means.

* * * * *